(12) United States Patent
Taguchi et al.

(10) Patent No.: US 7,048,790 B2
(45) Date of Patent: *May 23, 2006

(54) BLACK INK FOR INKJET RECORDING

(75) Inventors: Toshiki Taguchi, Shizuoka (JP);
Toshiaki Aono, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 130 days.

This patent is subject to a terminal disclaimer.

(21) Appl. No.: 10/671,729

(22) Filed: Sep. 29, 2003

(65) Prior Publication Data

US 2004/0070654 A1 Apr. 15, 2004

(30) Foreign Application Priority Data

Sep. 30, 2002 (JP) ............................ P.2002-286486

(51) Int. Cl.
*C09D 11/02* (2006.01)

(52) U.S. Cl. ............................... 106/31.46; 106/31.48; 106/31.5; 106/31.52

(58) Field of Classification Search ............ 106/31.27, 106/31.48, 31.5, 31.52, 31.46
See application file for complete search history.

(56) References Cited

U.S. PATENT DOCUMENTS

| | | | | |
|---|---|---|---|---|
| 4,818,285 | A * | 4/1989 | Causley et al. | 106/31.43 |
| 2004/0053988 | A1 * | 3/2004 | Taguchi et al. | 514/419 |
| 2004/0070654 | A1 * | 4/2004 | Taguchi et al. | 347/100 |
| 2004/0080596 | A1 * | 4/2004 | Taguchi et al. | 347/100 |
| 2004/0154496 | A1 * | 8/2004 | Taguchi | 106/31.48 |
| 2004/0187734 | A1 * | 9/2004 | Ozawa et al. | 106/31.27 |
| 2004/0187736 | A1 * | 9/2004 | Taguchi et al. | 106/31.27 |
| 2004/0187738 | A1 * | 9/2004 | Taguchi et al. | 106/31.48 |

FOREIGN PATENT DOCUMENTS

EP 0422668 * 4/1991

* cited by examiner

*Primary Examiner*—Helene Klemanski
(74) *Attorney, Agent, or Firm*—Sughrue Mion, PLLC

(57) ABSTRACT

Provided is a black ink for inkjet recording obtained by dissolving and/or dispersing, in an aqueous medium, at least one black azo dye having a specific property or structure and further containing at least one metal chelating agent, which is excellent in durability of image including image quality and discharge property even after the ink is filled in an ink cassette and stored for a long period of time while being set in a printer.

14 Claims, No Drawings

BLACK INK FOR INKJET RECORDING

FIELD OF THE INVENTION

The present invention relates to a black ink for inkjet recording excellent in durability of images and discharge property of the ink even after long-term passage.

BACKGROUND OF THE INVENTION

In recent years, with the wide spread use of computers, inkjet printers have come be used widely for printing images on paper, film or cloth not only in offices but also at home.

Inkjet recording methods include a method of discharging liquid droplets by applying pressure through a piezo element, a method of generating bubbles in an ink by heat, thereby discharging liquid droplets, a method of using ultrasonic waves, and a method of attracting and discharging liquid droplets by electrostatic power. As an ink composition for such inkjet recording, water-based inks, oil-based inks or solid (melting type) inks are employed. Of these inks, water-based inks are mainly used in view of productivity, handling properties, smell and safety.

Colorants to be used in these inkjet recording inks are required to have a high solubility in a solvent, permit high-density recording, provide a good hue, have excellent fastness against light, heat, air, water and chemicals, exhibit good fixation to an image receiving material and cause less blurring, have excellent storage stability in the form of an ink, have no toxicity, have a high purity and be available at a low cost. However, it is extremely difficult to find colorants capable of satisfying these requirements at high levels.

Various dyes and pigments have already been proposed and practically used as colorants for inkjet recording but, colorants capable of satisfying all of these requirements have not been found yet. Dyes and pigments which have conventionally been well known and have respective Color Index (C.I.) numbers cannot simultaneously attain both the hue and fastness required for an inkjet recording ink.

As a black dye for inkjet recording, food black dyes, naphthol direct azo dyes and acid azo dyes have widely been known so far.

Typical examples of the food black dyes include C.I. Food Black 1 and C.I. Food Black 2. A description on the using technique of these dyes for inkjet black ink can be found in Japanese Patent Laid-Open No. 36276/1990, Japanese Patent Laid-Open No. 233782/1990 and Japanese Patent Laid-Open No. 233783/1990.

The using technique of C.I. Acid Black 2, C.I. Acid Black 31, C.I. Acid Black 52, C.I. Acid Black 140 and C.I. Acid Black 187 as an acidic azo dye is described in Japanese Patent Laid-Open No. 108481/1985, Japanese Patent Laid-Open No. 36277/1990 and Japanese Patent Laid-Open No. 36278/1990, while that of C.I. Direct Black 9, C.I. Direct Black 17, C.I. Direct Black 38, C.I. Direct Black 51, C.I. Direct Black 60, C.I. Direct Black 102, C.I. Direct Black 107, C.I. Direct Black 122, C.I. Direct Black 142, C.I. Direct Black 154 and C.I. Direct Black 168 as a direct azo dye is described in Japanese Patent Laid-Open No. 139568/1981, Japanese Patent Laid-Open No. 285275/1986 and Japanese Patent Laid-Open No. 106974/1991.

It is usually very difficult to produce the color hue of black only by a single dye so a short-wavelength dye is preferably used in combination.

As this short wavelength dye, direct azo dyes and acid azo dyes are widely known, and the using technique of C.I. Acid Yellow 17, C.I. Acid Yellow 23, C.I. Acid Yellow 49 and C.I. Acid Yellow 194, and C.I. Direct Yellow 86, C.I. Direct Yellow 120, C.I. Direct Yellow 132 and C.I. Direct Yellow 144 for inkjet black ink is described in Japanese Patent Laid-Open No. 97541/1995, International Publication No. 97/16496, Japanese Patent Laid-Open No. 158560/1998 and Japanese Patent Laid-Open No. 12514/1999.

The dye of the invention is superior in fastness to these known dyes and using technique of the dye of the invention as an inkjet black ink is described in Japanese Patent Application No. 2002-113460.

The present inventors have proceeded wit an investigation on inkjet inks using a dye. As a result, it has been found that an aqueous black ink has such a drawback as low image durability; and that different from carbon black, almost no black dyes are capable of producing black images having high print quality required for printing of characters by the single use of them and several dyes different in absorption spectrum must be mixed. It has also been found that if some dyes are mixed, the quality of an image including therein a black image is impaired remarkably by a difference in fading rate among them, or by a change in absorption waveform of the dye having broad absorption characteristics owing to fading. Since the solid concentration of a water soluble black ink tends to become high because of necessity of having absorption characteristics sufficient to cover a wide ranging wavelength region, a solubility of the dye in a water-based solvent is important. The dye, to which a dissociation group has therefore been introduced, is frequently used in the form of a metal salt. By the existence of a heavy metal, damage of a head is accelerated and such a deterioration is marked particularly under high humidity conditions.

SUMMARY OF THE INVENITON

An object of the present invention is to provide a black ink for inkjet recording excellent in durability of images including durability of image quality, and in discharge property even after long term has passed while being filled in an ink cassette and set in a printer.

The object of the present invention is accomplished by the black ink for inkjet recordings as described below in the items.

1. A black ink for inkjet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0, wherein the black ink comprises at least one metal chelating agent and has a forced fading rate constant $k_{vis}$ of $5.0 \times 10^{-2}$ [hour$^{-1}$] or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ is reaches 80% of the initial density.

2. A black ink for inkjet recording, comprising a first dye and a second dye dissolved and/or dispersed in an aqueous medium, in which the first dye has a λmax of 500 to 700 nm and a half value width of 100 nm or more in an absorption spectrum of a dilute solution normalized to an absorbance of 1.0 and the second dye has a λmax of 350 to 500 nm in an absorption spectrum of an aqueous solution, wherein the black ink comprises at least one metal chelating agent.

3. A black ink for inkjet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0, wherein the black ink comprises at least one metal chelating agent and has a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

4. A black ink for inkjet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0, wherein the black ink comprises: at least one metal chelating agent; and a dye having an oxidation potential of more than 1.0 V (vs SCE).

5. The black ink for inkjet recording according to the item 4, wherein the dye having a λmax of 500 to 700 nm includes a dye having an oxidation potential of more than 1.0 V (vs SCE).

6. The black ink for inkjet recording according to the item 1, which has a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

7. The black ink for inkjet recording according to the item 6, which comprises a dye having an oxidation potential of more than 1.0 V (vs SCE).

8. The black ink for inkjet recording according to the item 2, which has: a forced fading rate constant $k_{vis}$ of $5.0 \times 10^{-2}$ [hours$^{-1}$] or less; and a ratio R of 1.2 or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density, and the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

9. The black ink for inkjet recording according to the item 8, which comprises a dye having an oxidation potential of more than 1.0 V (vs SCE).

10. The black ink for inkjet recording according to the item 3, which has a forced fading rate constant $k_{vis}$ of $5.0 \times 10^{-2}$ hour$^{-1}$ or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density.

11. The black ink for inkjet recording according to the item 10, which comprises a dye having an oxidation potential of more than 1.0 V (vs SCE).

12. The black ink for inkjet recording according to the item 1, which comprises a dye represented by the following general formula (1):

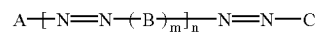

wherein A, B and C each independently represent an aromatic or heterocyclic group, which are substituted or unsubstituted; m is 1 or 2; n is an integer of 0 or more.

13. The black ink for inkjet recording according to the item 12, wherein the dye represented by the general formula (1) includes a dye having a λmax of 350 to 500 nm in an absorption spectrum of an aqueous solution.

14. The black ink for inkjet recording according to the item 2, which comprises a dye represented by the following general formula (1):

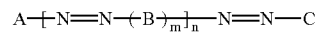

wherein A, B and C each independently represent an aromatic or heterocyclic group, which are substituted or unsubstituted; m is 1 or 2; n is an integer of 0 or more.

15. The black ink for inkjet recording according to the item 14, wherein the dye represented by the general formula (1) includes a dye having a λmax of 350 to 500 nm in an absorption spectrum of an aqueous solution.

16. The black ink for inkjet recording according to the item 3, which comprises a dye represented by the following general formula (1):

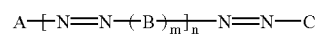

wherein A, B and C each independently represent an aromatic or heterocyclic group, which are substituted or unsubstituted; m is 1 or 2; n is an integer of 0 or more.

17. The black ink for inkjet recording according to the item 16, wherein the dye represented by the general formula (1) includes a dye having a λmax of 350 to 500 nm in an absorption spectrum of an aqueous solution.

18. The black ink for inkjet recording according to the item 4, which comprises a dye represented by the following general formula (1):

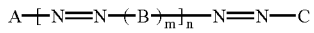

wherein A, B and C each independently represent an aromatic or heterocyclic group, which are substituted or unsubstituted; m is 1 or 2; n is an integer of 0 or more.

19. The black ink for inkjet recording according to the item 18, wherein the dye represented by the general formula (1) includes a dye having a λmax of 350 to 500 nm in an absorption spectrum of an aqueous solution.

DETAILED DESCRIPTION OF THE INVENTION

The present invention will hereinafter be described specifically.

For the black ink for inkjet recording of the invention, a dye (L) having λmax ranging from 500 nm to 700 nm and a half value width ($W_{\lambda,1/2}$), in the absorption spectrum of a dilute solution normalized to an absorbance of 1.0, of 100 nm or greater (preferably 120 nm or greater but not greater than 500 nm, more preferably 120 nm or greater but not greater than 350 nm) is employed.

If the dye (L) can realize "(solid) black" with a high image quality, that is, black not influenced by a light source for observation and at the same time, capable of expressing its color without having an emphasis on any color of B, G and R, this dye can be used alone as a dye for black ink. It is however the common practice to use, in combination, a dye capable of covering a region in which the absorption of the above-described dye is low. Combined use of a dye (S) having a main absorption in a yellow region is usually preferred. It is also possible to prepare a black ink by using another dye in combination.

In the invention, a black ink is prepared by dissolving or dispersing the dye alone or a mixture thereof with another dye in an aqueous medium. In order to impart the black ink with desirable performances such as 1) excellent weather resistance and/or 2) well balance in black color even after fading, it is prepared to satisfy the below-described conditions.

A black square symbol of JIS code 2223 is printed in 48 point by using the black ink and the reflection density ($D_{vis}$) of the print as measured by Status A Filter (visual filter) is defined as initial density. Examples of a reflection densitometer equipped with Status A Filter include X-Rite densitometer. Upon measurement of the density of "black", $D_{vis}$ is used as a standard observational reflection density. The print is forced to fade by exposing it to an ozone fading tester capable of continuously generating 5 ppm of ozone and a forced fading rate constant ($k_{vis}$) is determined, in accordance with the relational expression: "$0.8 = \exp(-k_{vis} \cdot t)$", from the time required for the reflection density ($D_{vis}$) to decrease to 80% of the initial reflection density.

In the invention, the ink is prepared so that its rate constant ($k_{vis}$) will fall within a range of $5.0 \times 10^{-2}$ [hour$^{-1}$] or less, preferably $3.0 \times 10^{-2}$ [hour$^{-1}$] or less, more preferably $1.0 \times 10^{-2}$ [hour$^{-1}$] or less (condition 1).

A black square symbol of JIS code 2223 is printed in 48 point by using the black ink and the reflection density not ($D_{vis}$) but reflection densities ($D_R$, $D_G$, $D_B$) of three colors C (cyan), M (magenta) and Y (yellow) as measured by Status A Filter (visual filter) are also defined as initial densities. Here, the term ($D_R$, $D_G$, $D_B$) means (reflection density of C by a red filter, reflection density of M by a green filter, reflection density of Y by a blue filter). In accordance with the above-described method, the print is forced to fade by exposing it to an ozone fading tester capable of continuously generating 5 ppm of ozone and forced fading rate constants ($k_R$, $k_G$, $k_B$) are determined from the time required for the reflection densities ($D_R$, $D_G$, $D_B$) to decrease to 80% of the initial reflection densities. In the invention, the ink is prepared so that a ratio (R) of the maximum value to the minimum value of the thus determined three rate constants (for example, when $k_R$ is the maximum value and $k_G$ is the minimum value, $R = k_R/k_G$) will become 1.2 or less, preferably 1.1 or less, more preferably 1.05 or less. (Condition 2)

"The print of a black square symbol of JIS code 2223 printed in 48 point" as described above is an image printed with a size large enough to cover the aperture of a densitometer, which enables sufficient density measurement.

In addition, at least one of the dyes to be used for the black ink has oxidation potential nobler than 1.0 V (vs SCE), preferably nobler than 1.1 V (vs SCE), more preferably nobler than 1.2 V (vs SCE), most preferably nobler than 1.25 V (vs SCE) and one of the at least one of the dyes has preferably λmax of 500 nm or greater. (Condition 3).

The oxidation potential in the invention is a value as measured by DC polarography in N,N-dimethylformamide (the concentration of the compound in the solution: $1 \times 10^{-3}$ mol·dm$^{-3}$) containing 0.1 mol·dm$^{-3}$ of tetrapropylammonium perchlorate as a supporting electrolyte while using SCE (saturated calomel electrode) as a reference electrode, a graphite electrode as a working electrode and a platinum electrode as a counter electrode. A water soluble dye is not always easily soluble in N,N-dimethylformamide directly and in such a case, prior to measurement, the dye is dissolved in a small amount of water and then the resulting solution is diluted with N,N-dimethylformamide to give a water content of 2% or less.

The oxidation potential sometimes deviates by about dozens of millivolts owing to influences of a liquid-liquid potential difference and resistance of a sample solution, but reproducibility of the value measured as the potential can be guaranteed by correcting it using a standard sample (for example, hydroquinone).

Moreover, the black ink of the invention may be prepared using the azo dyes of the above-described formula (1). As the azo dyes of the formula (1), dyes (L) which have λmax ranging from 500 nm to 700 nm, and have a half value width, in absorption spectrum of a dilute solution normalized to have an absorbance of 1.0, of 100 nm or greater are usable. In addition, dyes (S) which have λmax ranging from 350 nm to 500 nm are usable. It is preferred that at least one of the dyes (L) is the dye of the formula (1), with a case where at least one of the dyes (L) and at least one of the dyes (S) are each the dye of the formula (1) being more preferred. It is particularly preferred that 90 wt. % of all the dyes in the ink are the dyes of the formula (1). (Condition 4)

The black ink to be used in the invention satisfies at least one of the above-described four conditions.

A detailed description will next be made of the dyes (L) out of the dyes represented by the formula (1).

In the formula (1), A, B and C each independently represents an aromatic or heterocyclic group which may be substituted (A and C represent a monovalent group, while B represents a divalent group), m stands for 1 or 2, and n stands for an integer of 0 or greater.

Among them, compounds of the formula (1) in which m and n each stands for 1 or 2 are preferred. In this case, at least two of A, B and C preferably represent an unsaturated heterocyclic group which may be substituted. Compounds of the formula (1) in which m and n each stands for 1 and at least B and C represent an unsaturated heterocyclic group are particularly preferred.

The azo dyes of the formula (1) are especially preferred when they are represented by the following formula (2).

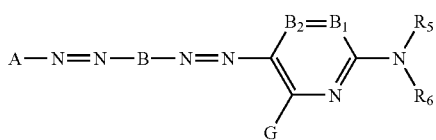

In the above-described formula (2), A and B have the same meanings as described above in the formula (1). $B_1$ and $B_2$ represent =$CR_1$— and —$CR_2$=, respectively, or either one represents a nitrogen atom and the other one represents =$CR_1$— or —$CR_2$=.

G, $R_1$, and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, an ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclothio group, an alkyl- or aryl-sulfonyl group, a heterocyclic sulfonyl group, an alkyl- or aryl-sulfinyl group, a heterocyclic sulfinyl group, a sulfamoyl group or a sulfo group, which may have a substituent further.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, which may have a substituent further, with the proviso that $R_5$ and $R_6$ do not represent a hydrogen atom at the same time.

A pair $R_1$ and $R_5$, or a pair $R_5$ and $R_6$ may be coupled to form a 5- or 6-membered ring.

The azo dye represented by the formula (2) is preferably a dye represented by the following formula (3).

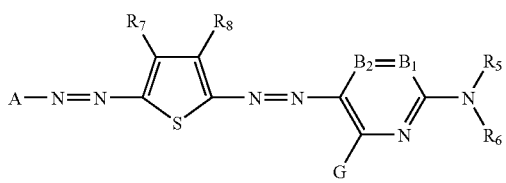

In the above-described formula (3), $R_7$ and $R_8$ have the same meanings as $R_1$ in the formula (2).

Examples of the halogen atom include fluorine, chlorine and bromine atoms.

The term "aliphatic group" as used herein means an alkyl group, a substituted alkyl group, an alkenyl group, a substituted alkenyl group, an alkynyl group, a substituted alkynyl group, an aralkyl group or a substituted aralkyl group. The aliphatic group may be branched or may form a ring. The aliphatic group preferably has 1 to 20, more preferably 1 to 16 carbon atoms. The aryl portion of the aralkyl or substituted aralkyl group is preferably phenyl or naphthyl, with phenyl being especially preferred. Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

The term "monovalent aromatic group" as used herein means an aryl group or a substituted aryl group. As the aryl group, phenyl or naphthyl is preferred, with phenyl being especially preferred. The monovalent aromatic group has preferably 6 to 20, more preferably 6 to 16 carbon atoms. Examples of the monovalent aromatic group include phenyl, p-tolyl, p-methoxyphenyl, o-chlorophenyl and m-(3-sulfopropylamino)phenyl. The term "divalent aromatic group" as used herein means the above-described aromatic group but being divalent instead of monovalent. Examples include phenylene, p-tolylene, p-methoxyphenylene, o-chlorophenylene, m-(3-sulfopropylamino)phenylene and naphthylene.

The term "heterocyclic group" means both a heterocyclic group having a substituent and an unsubstituted heterocyclic group. The heterocycle may be condensed with an aliphatic ring, an aromatic ring or another heterocycle. As the heterocyclic group, a 5- or 6-membered heterocyclic group is preferred. Examples of the hetero atom of a heterocycle include N, O and S. Examples of the substituent include aliphatic groups, halogen atoms, alkyl- and aryl-sulfonyl groups, acyl groups, acylamino groups, sulfamoyl group, carbamoyl group and ionic hydrophilic groups. Examples of the heterocycle used for the monovalent or divalent heterocyclic group include pyridine, thiophene, thiazole, benzothiazole, benzoxazole and furan rings.

The term "carbamoyl group" means both a carbamoyl group having a substituent and an unsubstituted carbamoyl group. Examples of the substituent include alkyl groups. Examples of the carbamoyl group include methylcarbamoyl and dimethylcarbamoyl groups.

The term "alkoxycarbonyl group" means both an alkoxycarbonyl group having a substituent and an unsubstituted alkoxycarbonyl group. The alkoxycarbonyl group has preferably 2 to 20 carbon atoms. Examples of the substituent include ionic hydrophilic groups. Examples of the alkoxycarbonyl group include methoxycarbonyl and ethoxycarbonyl groups.

The term "aryloxycarbonyl group" means both an aryloxycarbonyl group having a substituent and an unsubstituted aryloxycarbonyl group. The aryloxycarbonyl group has preferably 7 to 20 carbon atoms. Examples of the substituent include ionic hydrophilic groups. Examples of the aryloxycarbonyl group include phenoxycarbonyl.

The term "heterocyclic oxycarbonyl group" means both a heterocyclic oxycarbonyl group having a substituent and an unsubstituted heterocyclic oxycarbonyl group. The heterocyclic oxycarbonyl group has preferably 2 to 20 carbon atoms. Examples of the substituent include ionic hydrophilic groups. Examples of the heterocyclic oxycarbonyl group include 2-pyridyloxycarbonyl.

The term "acyl group" means both an acyl group having a substituent and an unsubstituted acyl group. The acyl group has preferably 1 to 20 carbon atoms. Examples of the substituent include ionic hydrophilic groups. Examples of the acyl group include acetyl and benzoyl.

The term "alkoxy group" means both an alkoxy group having a substituent and an unsubstituted alkoxy group. As the alkoxy group, that having 1 to 20 carbon atoms is preferred. Examples of the substituent include alkoxy groups, hydroxyl group, and ionic hydrophilic groups. Examples of the alkoxy group include methoxy, ethoxy, isopropoxy, methoxyethoxy, hydroxyethoxy and 3-carboxypropoxy.

The term "aryloxy group" means both an aryloxy group having a substituent and an unsubstituted aryloxy group. As the aryloxy group, that having 6 to 20 carbon atoms is preferred. Examples of the substituent include alkoxy groups and ionic hydrophilic groups. Examples of the aryloxy group include phenoxy, p-methoxyphenoxy and o-methoxyphenoxy.

The term "heterocyclic oxy group" means both a heterocyclic oxy group having a substituent and an unsubstituted heterocyclic oxy group. The heterocyclic oxy group has preferably 2 to 20 carbon atoms. Examples of the substituent include alkyl, alkoxy and ionic hydrophilic groups. Examples of the heterocyclic oxy group include 3-pyridyloxy and 3-thienyloxy.

As the silyloxy group, that substituted with a $C_{1-20}$ aliphatic or aromatic group is preferred. Examples of the silyloxy group include trimethylsilyloxy and diphenylmethylsilyloxy.

The term "acyloxy group" means both an acyloxy group having a substituent and an unsubstituted acyloxy group. The acyloxy group has preferably 2 to 20 carbon atoms. Examples of the substituent include ionic hydrophilic groups. Examples of the acyloxy group include acetoxy and benzoyloxy.

The term "carbamoyloxy group" means a carbamoyloxy group having a substituent or an unsubstituted carbamoyloxy group. Examples of the substituent include alkyl groups. Examples of the carbamoyloxy group include N-methylcarbamoyloxy group.

The term "alkoxycarbonyloxy group" means both an alkoxycarbonyloxy group having a substituent and an unsubstituted alkoxycarbonyloxy group. The alkoxycarbonyloxy group has preferably 2 to 20 carbon atoms. Examples of the alkoxycarbonyloxy group include methoxycarbonyloxy and isopropoxycarbonyloxy.

The term "aryloxycarbonyloxy group" means both an aryloxycarbonyloxy group having a substituent and an unsubstituted aryloxycarbonyloxy group. The aryloxycarbonyloxy group has preferably 7 to 20 carbon atoms. Examples of the aryloxycarbonyloxy group include phenoxycarbonyloxy.

The term "amino group" means an amino group substituted with an alkyl, aryl or heterocyclic group and the alkyl group, aryl group or heterocyclic group may have a substituent further. As the alkylamino group, that having 1 to 20 carbon atoms is preferred. Examples of the substituent include ionic hydrophilic groups. Examples of the alkylamino group include methylamino and diethylamino.

The term "arylamino group" means both an arylamino group having a substituent and an unsubstituted arylamino group. As the arylamino group, that having 6 to 20 carbon atoms is preferred. Examples of the substituent include halogen atoms and ionic hydrophilic groups. Examples of the arylamino group include anilino and 2-chloroanilino.

The term "heterocyclic amino group" means both a heterocyclic amino group having a substituent and an unsubstituted heterocyclic amino group. As the heterocyclic amino group, that having 2 to 20 carbon atoms is preferred. Examples of the substituent include alkyl groups, halogen atoms and ionic hydrophilic groups.

The term "acylamino group" means both an acylamino group having a substituent and an unsubstituted acylamino group. The acylamino group has preferably 2 to 20 carbon atoms. Examples of the substituent include ionic hydrophilic groups. Examples of the acylamino group include acetylamino, propionylamino, benzoylamino, N-phenylacetylamino and 3,5-disulfobenzoylamino.

The term "ureido group" means both an ureido group having a substituent and an unsubstituted ureido group. The ureido group has preferably 1 to 20 carbon atoms. Examples of the substituent include alkyl and aryl groups. Examples of the ureido group include 3-methylureido, 3,3-dimethylureido and 3-phenylureido.

The term "sulfamoylamino group" means both a sulfamoylamino group having a substituent and an unsubstituted sulfamoylamino group. Examples of the substituent include alkyl groups. Examples of the sulfamoylamino group include N,N-dipropylsulfamoylamino.

The term "alkoxycarbonylamino group" means both an alkoxycarbonylamino group having a substituent and an unsubstituted alkoxycarbonylamino group. The alkoxycarbonylamino group has preferably 2 to 20 carbon atoms. Examples of the substituent include ionic hydrophilic groups. Examples of the alkoxycarbonylamino group include ethoxycarbonylamino group.

The term "aryloxycarbonylamino group" means both an aryloxycarbonylamino group having a substituent and an unsubstituted aryloxycarbonylamino group. The aryloxycarbonylamino group has preferably 7 to 20 carbon atoms. Examples of the substituent include ionic hydrophilic groups. Examples of the aryloxycarbonylamino group include phenoxycarbonylamino.

The term "alkyl- or aryl-sulfonylamino group" means both an alkyl- or aryl-sulfonylamino group having a substituent, and an unsubstituted alkyl- or aryl-sulfonylamino group. The sulfonylamino group has preferably 1 to 20 carbon atoms. Examples of the substituent include ionic hydrophilic groups. Examples of the sulfonylamino group include methylsulfonylamino, N-phenylmethylsulfonylamino, phenylsulfonylamino and 3-carboxyphenylsulfonylamino.

The term "heterocyclic sulfonylamino group" means both a heterocyclic sulfonylamino group having a substituent and an unsubstituted heterocyclic sulfonylamino group. The heterocyclic sulfonylamino group has preferably 1 to 12 carbon atoms. Examples of the substituent include ionic hydrophilic groups. Examples of the heterocyclic sulfonylamino group include 2-thiophenesulfonylamino and 3-pyridinesulfonylamino.

The term "heterocyclic sulfonyl group" means both a heterocyclic sulfonyl group having a substituent and an unsubstituted heterocyclic sulfonyl group. The heterocyclic sulfonyl group has preferably 1 to 20 carbon atoms. Examples of the substituent include ionic hydrophilic groups. Examples of the heterocyclic sulfonyl group include 2-thiophenesulfonyl and 3-pyridinesulfonyl.

The term "heterocyclic sulfinyl group" means both a heterocyclic sulfinyl group having a substituent and an unsubstituted heterocyclic sulfinyl group. The heterocyclic sulfinyl group has preferably 1 to 20 carbon atoms. Examples of the substituent include ionic hydrophilic groups. Examples of the heterocyclic sulfinyl group include 4-pyridinesulfinyl.

The term "alkyl-, aryl- or heterocyclo-thio group" means both an alkyl-, aryl- or heterocyclo-thio group having a substituent and an unsubstituted alkyl-, aryl- or heterocyclo-thio group. The alkyl-, aryl- or heterocyclo-thio group has preferably 1 to 20 carbon atoms. Examples of the substituent include ionic hydrophilic groups. Examples of the alkyl-, aryl- or heterocyclo-thio group include methylthio, phenylthio and 2-pyridylthio groups.

The term "alkyl- or aryl-sulfonyl group" means both an alkyl- or aryl-sulfonyl group having a substituent, and an unsubstituted alkyl- or aryl-sulfonyl group. Examples of the alkyl-and aryl-sulfonyl groups include methylsulfonyl group and phenylsulfonyl group, respectively.

The term "alkyl- or aryl-sulfinyl group" means both an alkyl- or aryl-sulfinyl group having a substituent, and an unsubstituted alkyl- or aryl-sulfinyl group. Examples of the alkyl- and aryl-sulfinyl groups include methylsulfinyl group and phenylsulfinyl group, respectively.

The term "sulfamoyl group" means both a sulfamoyl group having a substituent and an unsubstituted sulfamoyl group. Examples of the substituent include alkyl groups. Examples of the sulfamoyl group include dimethylsulfamoyl and di-(2-hydroxyethyl)sulfamoyl.

The formulas (1), (2) and (3) will next be described.

The above description will equally be applied to the groups and substituents which will be described later.

In the formula (1), A, B and C each independently represents an aromatic group (A and C each represents a monovalent aromatic group such as aryl; and B represents a divalent aromatic group such as arylene) which may be substituted, or a heterocyclic group (A and C each represents a monovalent heterocyclic group; and B represents a divalent heterocyclic group) which may be substituted. Examples of the aromatic ring include a benzene ring and a naphthalene ring. Examples of the hetero atom of the heterocycle include N, O and S. The heterocycle may be condensed with an aliphatic ring, an aromatic ring or another heterocycle.

The substituent may be an arylazo or heterocyclic azo group.

At least two of A, B and C are preferably a heterocyclic group.

Examples of the preferable heterocyclic group as C include aromatic nitrogen-containing 6-membered heterocyclic groups represented by the below-described formula (4). When C represents the aromatic nitrogen-containing 6-membered heterocyclic group represented by the formula (4), the formula (1) corresponds to the formula (2).

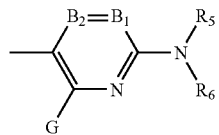

In the formula (4), $B_1$ and $B_2$ represent =$CR_1$— and —$CR_2$=, respectively or either one represents a nitrogen atom and the other one represents =$CR_1$— or —$CR_2$=, but the former one is preferred.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, which may have a substituent further. Preferred examples of the substituent represented by $R_5$ or $R_6$ include hydrogen atom, aliphatic groups, aromatic groups, heterocyclic groups, acyl groups, and alkyl- or aryl-sulfonyl groups, of which a hydrogen atom, aromatic groups, heterocyclic groups, acyl groups, alkyl- or aryl-sulfonyl groups are more preferred and a hydrogen atom, aryl groups and heterocyclic groups are most preferred. Each of these groups may have a substituent most preferred. $R_5$ and $R_6$ however do not represents a hydrogen atom at the same time.

G, $R_1$, and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino, arylamino and heterocyclic amino group), an acylamino group, an ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclothio group, an alkyl- or aryl-sulfonyl group, a heterocyclic sulfonyl group, an alkyl- or aryl-sulfinyl group, a heterocyclic sulfinyl group, a sulfamoyl group or a sulfo group, which may have a substituent further.

Preferred examples of the substituent represented by G include a hydrogen atom, halogen atoms, aliphatic groups, aromatic groups, a hydroxy group, alkoxy groups, aryloxy groups, acyloxy groups, heterocyclic oxy groups, amino groups (including alkylamino, arylamino and heterocyclic amino groups), acylamino groups, an ureido group, a sulfamoylamino group, alkoxycarbonylamino groups, aryloxycarbonylamino groups, alkyl- or aryl-thio groups, and heterocyclothio groups, of which a hydrogen atom, halogen atoms, alkyl groups, a hydroxy group, alkoxy groups, aryloxy groups, acyloxy groups, amino groups (including alkylamino, arylamino and heterocyclic amino groups), and acylamino groups are more preferred, with a hydrogen atom, anilino group and acylamino groups being most preferred. Each of these groups may have a substituent further.

Preferred examples of the substituent represented by $R_1$ or $R_2$ include a hydrogen atom, alkyl groups, halogen atoms, alkoxycarbonyl groups, a carboxyl group, a carbamoyl group, a hydroxy group, alkoxy groups and a cyano group. Each of these groups may have a substituent further.

A pair $R_1$ and $R_5$, or a pair $R_5$ and $R_6$ may be coupled to form a 5- or 6-membered ring.

When a substituent represented by A, $R_1$, $R_2$, $R_5$, $R_6$ or G has a substituent further, the substituents exemplified in G, $R_1$ and $R_2$ can be given as examples. A, $R_1$, $R_2$, $R_5$, $R_6$ or G preferably has, on any one position thereof, an ionic hydrophilic group as a substituent.

Examples of the ionic hydrophilic group as the substituent include a sulfo group, a carboxyl group, a phosphono group and quaternary ammonium groups. As the ionic hydrophilic group, carboxyl, phosphono and sulfo groups are preferred, with carboxyl and sulfo groups being especially preferred. The carboxyl, phosphono and sulfo groups may be in the form of a salt. Examples of the counterion which forms its salt include ammonium ion, alkali metal ions (ex. lithium ion, sodium ion and potassium ion) and organic cations (ex. tetramethylammonium ion, tetramethylguanidium ion and tetramethylphosphonium).

When B has a cyclic structure, preferred examples of the heterocycle include thiophene ring, thiazole ring, imidazole ring, benzothiazole ring and thienothiazole ring. Each of these heterocyclic groups may have a substituent further. Of these, thiophene ring, thiazole ring, imidazole ring, benzothiazole ring and thienothiazole ring represented by the below-described formulas (a) to (e), respectively are preferred. When B represents a thiophene ring represented by (a) and C has a structure represented by the formula (4), the formula (1) corresponds to the formula (3).

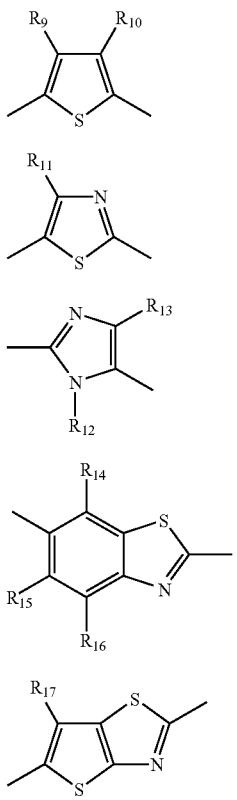

In the formulas (a) to (e), $R_9$ to $R_{17}$ each represents the same substituent as described in G, $R_1$ and $R_2$ of the formula (2).

In the present invention, a structure represented by the following formula (5) is particularly preferred.

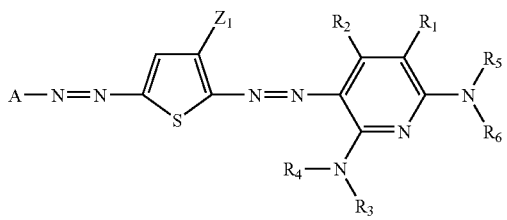

wherein, $Z_1$ represents an electron attractive group having a Hammett substituent constant δp of 0.20 or greater. The $Z_1$ is preferably an electron attractive group having the constant δp of 0.30 or greater, more preferably 0.45 or greater, especially 0.60 or greater. The constant δp not exceeding 1.0 is however preferred. Preferred specific examples of the substituent include electron attractive substituents which will be described later. Of these, preferred are $C_{2-20}$ acyl groups, $C_{2-20}$ alkyloxycarbonyl groups, nitro group, cyano group, $C_{1-20}$ alkylsulfonyl groups, $C_{6-20}$ arylsulfonyl groups, $C_{1-20}$ carbamoyl groups, and $C_{1-20}$ alkyl halide groups, of which cyano group, $C_{1-20}$ alkylsulfonyl groups, $C_{6-20}$ arylsulfonyl groups are especially preferred, with cyano group being most preferred.

$R_1$, $R_2$, $R_5$ and $R_6$ have the same meanings as described in the formula (2). $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group, or a sulfamoyl group. Of these, a hydrogen atom, an aromatic group, a heterocyclic group, an acyl group, and an alkyl or aryl-sulfonyl group are preferred, with a hydrogen atom, an aromatic group and a heterocyclic group being particularly preferred.

Each of the groups as described in the formula (5) may have a substituent further. When they have a substituent, the substituents as described in the formula (2), groups exemplified in G, $R_1$, or $R_2$, and ionic hydrophilic groups can be given as examples.

A description will next be made of a Hammett substituent constant σp value as used herein. The Hammett rule is an empirical rule suggested by L. P. Hammett in 1935 in order to deal quantitatively with the influence of substituents on reactions or equilibria of benzene derivatives. Its validity is widely accepted now. The substituent constants determined by the Hammett rule include σp values and σm values, many of which are found in general books and are described in detail, for example, in "Lange's Handbook of Chemistry," 12th edition, ed. by J. A. Dean, published in 1979 (McGraw-Hill), and in "Journal of Japanese Chemistry", Extra Number, No. 122, pages 96 to 103, 1979 (Nankodo Co., Ltd.). In the present invention, each substituent is stipulated or described by the Hammett substituent constant σp values. It is however needless to say that substituents are not limited by these values which are known and described in literature in these books but rather the present invention includes substituents whose Hammett substituent constant σp values are not known in the literature but when measured in accordance with the Hammett rule, are presumed to fall within its range. The compounds represented by the formulas (1) and (2) of the invention are not always benzene derivatives, but σp values are used as a measure for indicating electron effects of the substituent irrespective of the position of the substituent. In the invention, σp values are used in this sense.

Examples of electron attractive groups having an Hammett substituent constant σp value of 0.60 or greater include cyano group, nitro group, alkylsulfonyl groups (such as methanesulfonyl) and arylsulfonyl groups (such as benzenesulfonyl).

Examples of electron attractive groups having an Hammett substituent constant σp value of 0.45 or greater include, in addition to the above-described groups, acyl groups (such as acetyl), alkoxycarbonyl groups (such as dodecyloxycarbonyl), aryloxycarbonyl groups (such as m-chlorophenoxycarbonyl), alkylsulfinyl groups (such as n-propylsulfinyl), arylsulfinyl groups (ex. phenylsulfinyl), sulfamoyl groups (such as N-ethylsulfamoyl and N,N-dimethylsulfamoyl), and alkyl halide groups (such as trifluoromethyl).

Examples of the electron attractive groups having a Hammett substituent constant σp value of 0.30 or greater include, in addition to the above-described groups, acyloxy groups (such as acetoxy), carbamoyl groups (such as N-ethylcarbamoyl and N,N-dibutylcarbamoyl), halogenated alkoxy groups (such as trifluoromethyloxy), halogenated aryloxy groups (such as pentafluorophenyloxy), sulfonyloxy groups (ex. methylsulfonyloxy), halogenated alkylthio groups (such as difluoromethylthio), aryl groups substituted with at least two electron attractive groups having a σp value of 0.15 or greater (such as 2,4-dinitrophenyl and pentachlorophenyl) and heterocycles (such as 2-benzoxazolyl, 1-benzothiazolyl and 1-phenyl-2-benzimidazolyl).

Specific examples of the electron attractive group having a σp value of 0.20 or greater include, in addition to the above-described ones, halogen atoms.

Particularly preferred examples of the combination of the substituents of the azo dye represented by the formula (3) are as follows: As $R_5$ and $R_6$, preferred are a hydrogen atom, alkyl groups, aryl groups, heterocyclic groups, a sulfonyl group and acyl groups, of which a hydrogen atom, aryl groups, heterocyclic groups and a sulfonyl group are preferred, with a hydrogen atom, aryl groups and heterocyclic groups being most preferred. $R_5$ and $R_6$ however do not represent a hydrogen atom simultaneously.

As G, preferred are a hydrogen atom, halogen atoms, alkyl groups, a hydroxyl group, an amino group and acylamino groups, of which a hydrogen atom, halogen atoms, an amino group and acylamino groups are more preferred, with a hydrogen atom, an amino group and acylamino groups being still more preferred.

As A, preferred examples include aromatic groups, a pyridine ring, a pyrazole ring, an imidazole ring, an isothiazole ring, a benzoisothiazole ring, a thiadiazole ring, a thiazole ring, a benzothiazole ring, and a triazole ring. Of these, aromatic groups, and pyridine, isothiazole, benzoisothiazole, thiadiazole and benzothiazole rings are preferred, with aromatic groups, and pyridine and benzothiazole rings being most preferred.

$B_1$ and $B_2$ represent $=CR_1-$ and $-CR_2=$, respectively and, as each of $R_1$ and $R_2$, a hydrogen atom, an alkyl group, a halogen atom, a cyano group, a carbamoyl group, a carboxyl group, a hydroxy group, an alkoxy group and an alkoxycarbonyl group are preferred, of which a hydrogen atom, an alkyl group, a carboxyl group, a cyano group, and a carbamoyl group are more preferred.

As the compound of the formula (1), those having, as at least one of the substituents, the above-described preferred group are preferred, of which those having, as more substituents, the above-described preferred groups are more preferred, with those having, as all the substituents, the above-described preferred groups being most preferred.

Specific examples of the azo dye represented by the formula (1) will next be described. It should however be borne in mind that the azo dyes to be used in the present invention are not limited to the below-described examples and a carboxyl, phosphono or sulfo group may be in the form of a salt. Examples of the counterion which forms its salt include ammonium ion, alkali metal ions (ex. lithium ion, sodium ion and potassium ion) and organic cations (ex. tetramethylammonium ion, tetramethylguanidium ion, tetramethylphosphonium).

TABLE 1

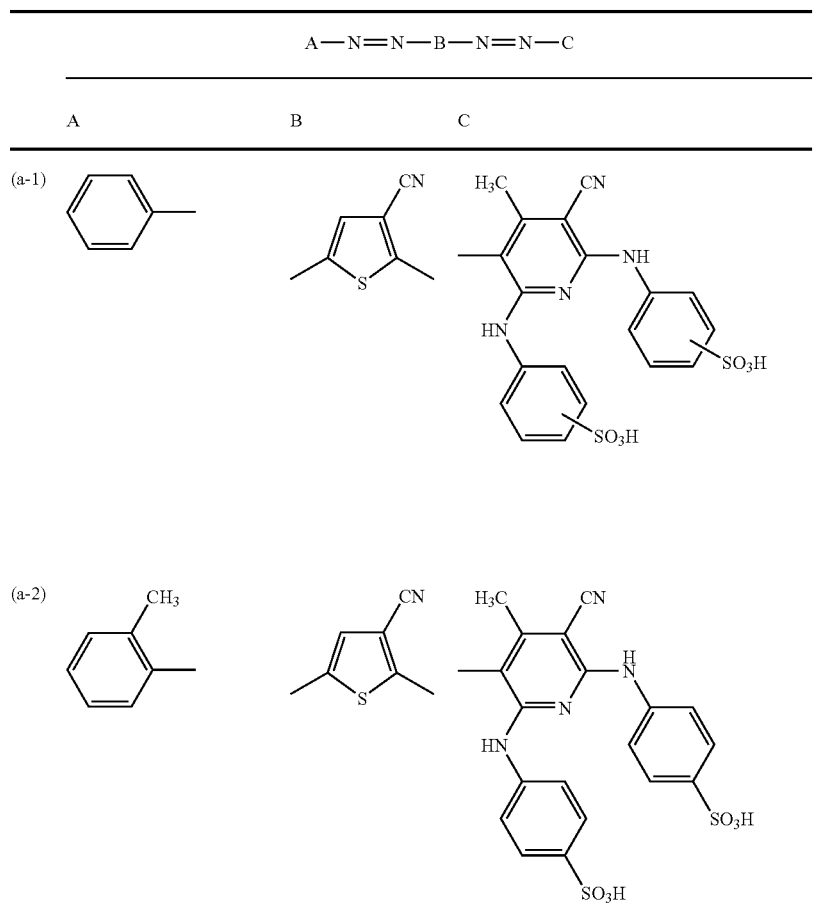

TABLE 1-continued
A—N=N—B—N=N—C
| | A | B | C |
|---|---|---|---|
| (a-3) | 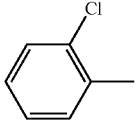 | 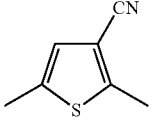 | 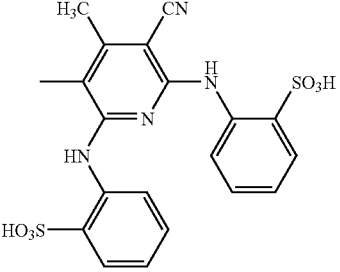 |
| (a-4) | 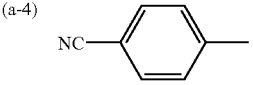 | 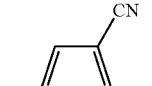 | 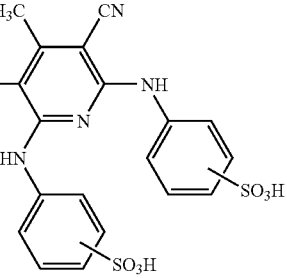 |
| (a-5) | 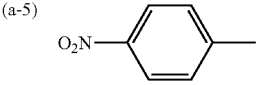 |  | 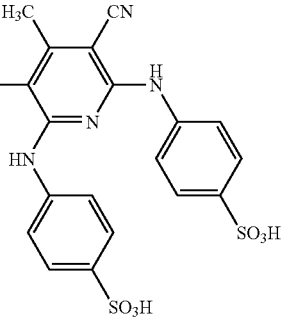 |
| (a-6) | 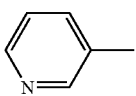 |  | 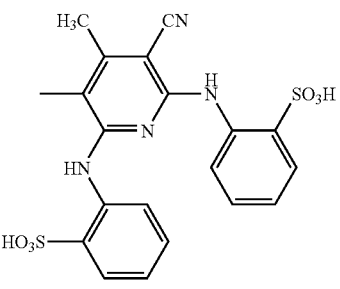 |

TABLE 2
A—N=N—B—N=N—C
| | A | B | C |
|---|---|---|---|
| (b-1) | 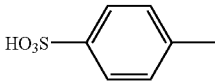 | 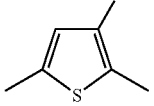 | 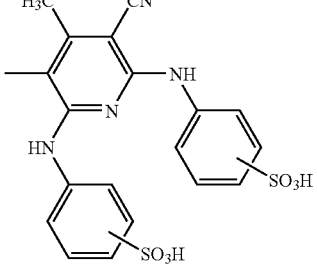 |
| (b-2) | 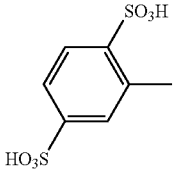 | 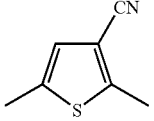 | 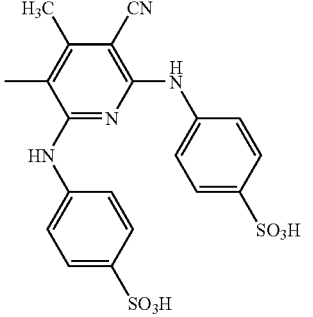 |
| (b-3) | 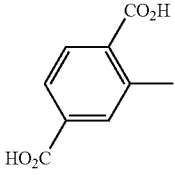 | 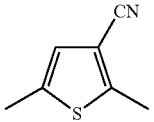 | 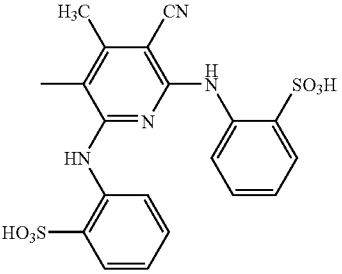 |
| (b-4) | 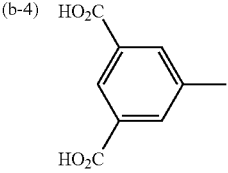 | 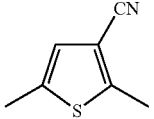 | 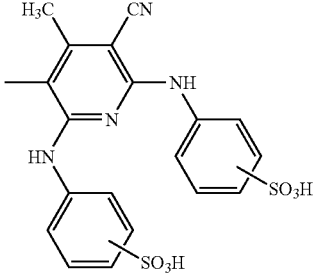 |
| (b-5) | 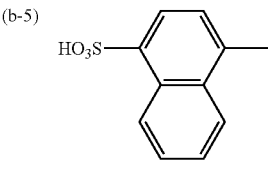 | 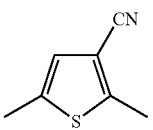 | 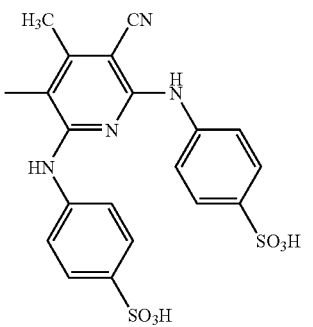 |

TABLE 2-continued $$A-N{=}N-B-N{=}N-C$$

| A | B | C |
|---|---|---|

(b-6), (b-7): chemical structures

TABLE 3

$$A-N{=}N-B-N{=}N-C$$

| A | B | C |
|---|---|---|

(c-1), (c-2): chemical structures

TABLE 3-continued
| | A—N=N—B—N=N—C | | |
|---|---|---|---|
| | A | B | C |
| (c-3) | 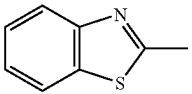 | 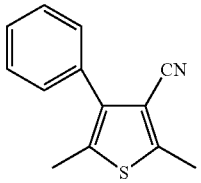 | 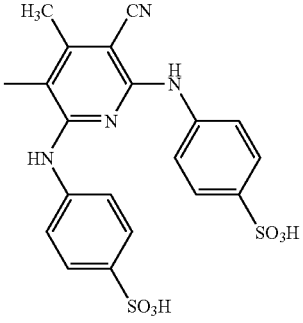 |
| (c-4) | 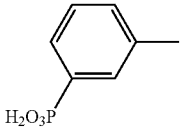 | 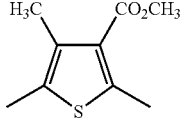 | 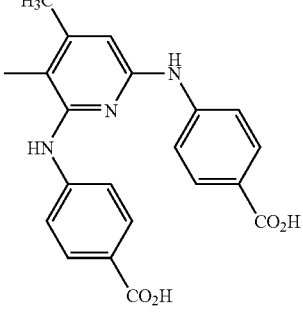 |
| (c-5) | 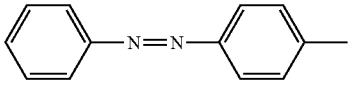 | 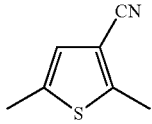 | 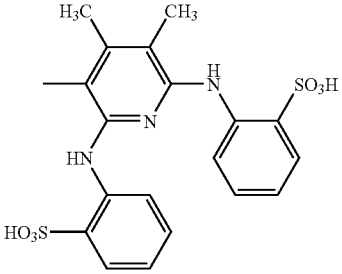 |
TABLE 4
| | A—N=N—B—N=N—C | | |
|---|---|---|---|
| | A | B | C |
| (d-1) | 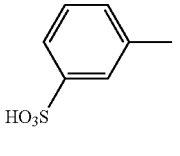 | 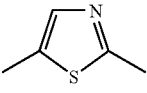 | 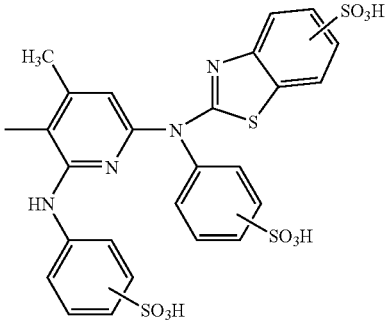 |

TABLE 4-continued
| | A | B | C |
|---|---|---|---|
(d-2) 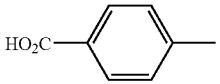 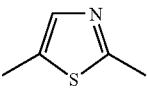 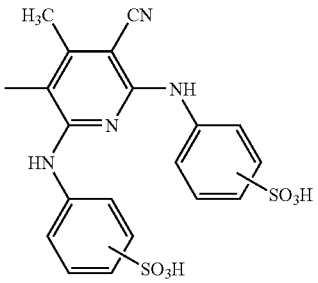
(d-3) 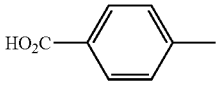 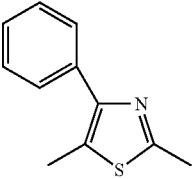 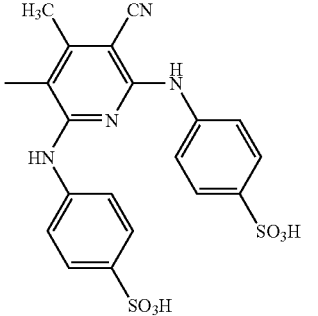
(d-4) 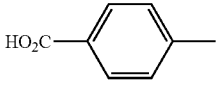 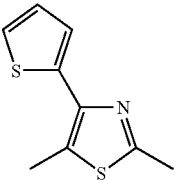 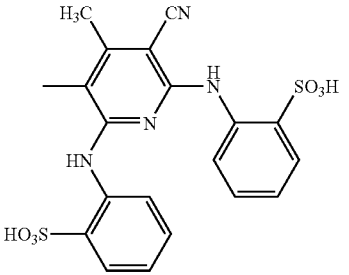
(d-5) 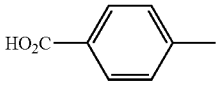 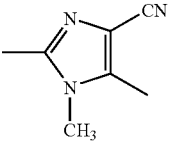 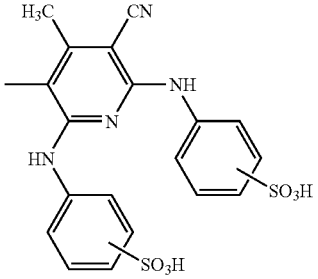

TABLE 4-continued
A—N=N—B—N=N—C
| A | B | C |
|---|---|---|
| (d-6) 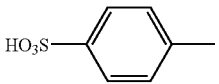 | 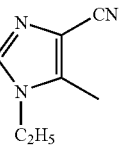 | 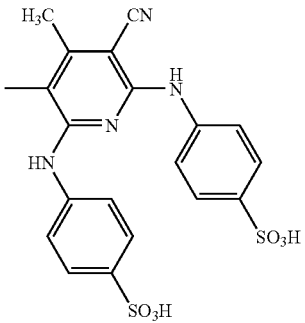 |
TABLE 5
A—N=N—B—N=N—C
| A | B | C |
|---|---|---|
| (e-1) 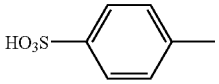 | 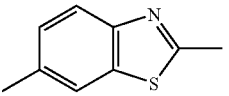 | 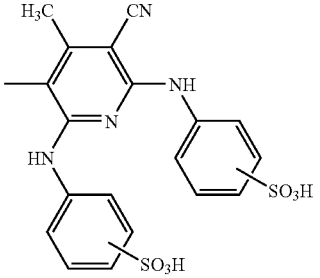 |
| (e-2) 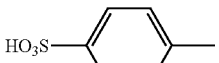 | 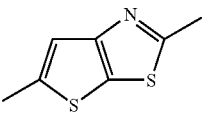 | 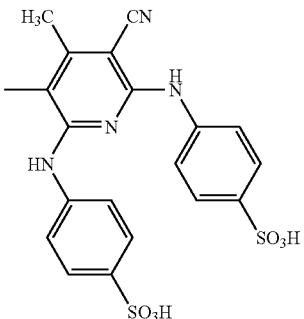 |

TABLE 6

A—N=N—B—N=N—C

| | A | B | C |
|---|---|---|---|
| (f-1) | 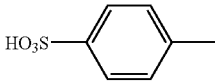 | 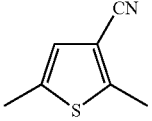 | 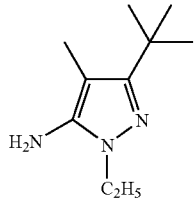 |
| (f-2) | 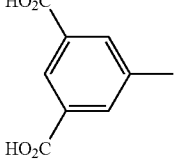 | 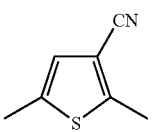 | 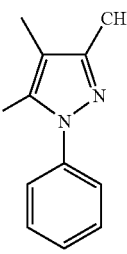 |
| (f-3) | 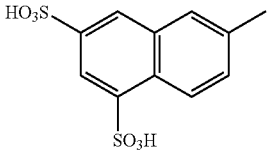 | 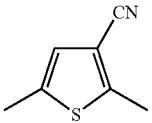 | 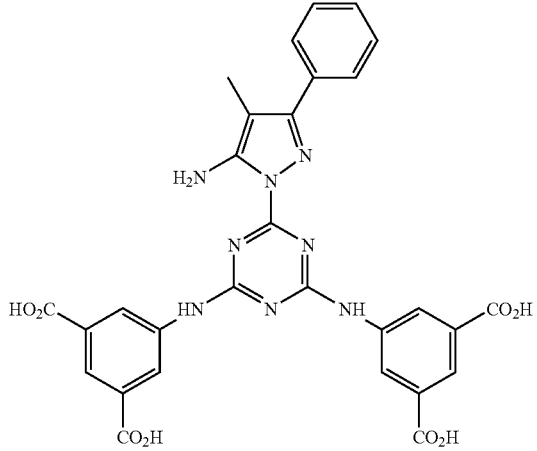 |
| (f-4) | 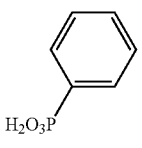 | 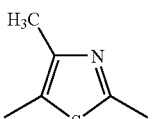 | 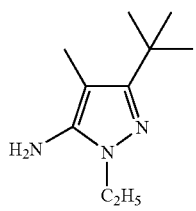 |

The dyes represented by the formulas (1), (2), (3) and (5) can be synthesized by coupling reaction between a diazo component and a coupler. The process as described in Japanese Patent Application No. 2002-11460 is a main synthesis process applicable to them.

If the dye (L) can realize (solid) black with high image quality, that is, black not influenced by a light source of observation and at the same time, capable of expressing its color without having an emphasis on any color of B, G and R, this dye can be used alone as a dye for black ink. It is however the common practice to use, in combination, a dye capable of covering a region in which the absorption of the above-described dye is low. Usually, a desirable black color is realized by using, in combination, a dye or pigment having the main absorption in a yellow region. Examples of the yellow dye usable here include ordinarily employed direct dyes and acid dyes typified by azo dyes and azomethine dyes. As the pigment, aqueous dispersions of general pigments attached with pigment No. can be used in combination. Use of the dyes of the formula (1) as the above-described short-wavelength-side dye (S) is particularly preferred.

Of the dyes represented by the formula (1), preferred as the short-wavelength-side dye (S) are azo dyes in which m and n each stands for 0, and A and C preferably represent a heterocyclic aromatic ring. The next preferred are azo dyes in which m and n each stands for 1.

In any case, dyes having oxidation potential (Eox) nobler than 1.0 V (vs SCE) are preferred, of which those having Eox nobler than 1.2 V (vs SCE) are particularly preferred.

The black ink can be prepared by using another dye in combination.

The black ink for inkjet recording of the invention contains 0.2 to 25 wt. %, preferably 0.5 to 15 wt. %, of the above-described dye (L) and, if necessary, (S) (which will be called "black dye(s) of the invention"), based on the total amount of the ink. The dye (S) can be added in an amount of from 1 to 80 wt. % based on the whole dye.

In the ink of the invention, another dye can be used in combination with the black dye(s) of the invention in order to provide a full-color image and adjust the color tone. Examples of the another dye usable in combination include those described below. As described above, the ink of the invention preferably contains the dye (S) having λmax of from 350 nm to 500 nm. Yellow dyes and yellow pigments described below are preferably employed.

Examples of the yellow dyes include aryl or heterylazo dyes having, as a coupling component, a phenol, naphthol, aniline, pyrazolone, pyridone, or open-chain type active methylene compound; azomethine dyes having an open-chain type active methylene compound as a coupling component; methine dyes such as benzylidene and monomethineoxonol dyes; quinone dyes such as naphthoquinone and anthraquinone dyes; and the other dyes such as quinophthalone, nitro•nitroso, acridine and acridinone dyes. These dyes may assume a yellow color for the first time when a portion of its chromophore is dissociated. In this case, a counter cation may be either an inorganic cation such as alkali metal or ammonium or an organic cation such as pyridinium or quaternary ammonium salt. Alternatively, it may be a polymer cation having, in its partial structure, such a cation.

Examples of the magenta dye include aryl or heterylazo dyes having a phenol, naphthol or aniline as a coupling component; azomethine dyes having a pyrazolone or pyrazolotriazole as a coupling component; methine dyes such as arylidene, styryl, merocyanine, and oxonol dyes; carbonium dyes such as diphenylmethane, triphenylmethane and xanthene dyes; quinone dyes such as naphthoquinone, anthraquinone and anthrapyridone dyes; and condensed polycyclic dyes such as dioxazine dyes. These dyes may assume a magenta color for the first time when a portion of its chromophore is dissociated. In this case, a counter cation may be either an inorganic cation such as alkali metal or ammonium or an organic cation such as pyridinium or quaternary ammonium salt. Alternatively, it may be a polymer cation having, in its partial structure, such a cation.

Examples of the cyan dye include azomethine dyes such as indoaniline dyes and indophenol dyes; polymethine dyes such as cyanine, oxonol and merocyanine dyes; carbonium dyes such as diphenylmethane, triphenylmethane and xanthene dyes; phthalocyanine dyes; anthraquinone dyes; aryl or heterylazo dyes having a phenol, naphthol or aniline as a coupling component; and indigo·thioindigo dyes. These dyes may assume a cyan color for the first time when a portion of its chromophore is dissociated. In this case, a counter cation may be either an inorganic cation such as alkali metal or ammonium or an organic cation such as pyridinium or quaternary ammonium salt. Alternatively, it may be a polymer cation having, in its partial structure, such a cation.

Black dyes such as polyazo dyes are also usable as well as the black dye(s) of the invention.

In addition, direct dyes, acid dyes, food dyes, basic dyes and reactive dyes which are soluble in water may be used in combination. Of these, preferred are: C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic black 8.

Further, pigments can be used in combination.

As the pigments, known pigments described in various literatures, as well as commercially available pigments are usable for the ink of the invention. The literatures are: "Color Index" (edited by The Society of Dyers and Colourists), "Kaitei Shinpan Ganryo Binran" (Revised Newly-Edited Pigment Handbook) edited by Nippon Ganryo Gijutsu Kyokai (published in 1989), "Saishin Ganryo Oyo Gijutsu" (The Newest Application Techniques of Pigments) published by CMC Shuppan (in 1986), "Insatsu Ink Gijutsu" (Printing Ink Techniques) published by CMC Shuppan (in 1984), and W. Herbst and K. Hunger, "Industrial Organic Pigments" (VCH Verlags gesellschaft, published in 1993). Specific examples of organic pigments include azo pigments (such as azo lake pigments, insoluble azo pigments, condensed azo pigments and chelate azo pigments), polycyclic pigments (such as phthalocyanine pigments, anthraquinone pigments, perylene and perinone pigments, indigo pigments, quinacridone pigments, dioxazine pigments, isoindolinone pigments, quinophthalone pigments and diketopyrrolopyrrole pigments), dyeing lake pigments (such as lake pigments from acidic or basic dyes) and azine pigments. Examples of inorganic pigments include yellow pigments such as C.I. Pigment Yellow 34, 37, 42 and 53, red pigments such as C.I. Pigment Red 101 and 108, blue pigments such as C.I. Pigment Blue 27, 29 and 17:1, black pigment such as C.I. Pigment Black 7 and magnetite, and white pigments such as C.I. Pigment White 4, 6, 18 and 21.

As pigments having color tones suited for image formation, preferred are blue or cyan pigments such as phthalocyanine pigments, anthraquinone pigments such as indanthrone pigments (for example, C.I. Pigment Blue 60) and dyeing lake pigments such as triarylcarbonium pigments, of which most preferred are phthalocyanine pigments (preferred examples include copper phthalocyanine pigments such as C.I. Pigment Blue 15:1, 15:2, 15:3, 15:4 and 15:6, monochloro- or low-chlorinated copper phthalocyanine pigments, aluminum phthalocyanine pigments as described in European Patent No. 860475, nonmetallophthalocyanine pigments such as C.I. Pigment Blue 16, and phthalocyanine pigments having as a central metal Zn, Ni or Ti, with C.I. Pigment Blue 15:3 and 15:4, and aluminum phthalocyanine pigments being especially preferred).

Preferred examples of the red or purple pigments include azo pigments (preferred are C.I. Pigment Red 3, 5, 11, 22, 38, 48:1, 48:2, 48:3, 48:4, 49:1, 52:1, 53:1, 57:1, 63:2, 144, 146 and 184, of which C.I. Pigment Red 57:1, 146 and 184 are particularly preferred), quinacridone pigments (preferred are C.I. Pigment Red 122, 192, 202, 207 and 209 and C.I. Pigment Violet 19 and 42, of which C.I. Pigment Red 122 is particularly preferred), dyeing lake pigment type triarylcarbonium pigments (preferred are xanthene type C.I. Pigment Red 81:1 and C.I. Pigment Violet 1, 2, 3, 27 and 39), dioxazine pigments (for example, C.I. Pigment Violet 23 and 37), diketopyrrolopyrrole pigments (for example, C.I. Pigment Red 254), perylene pigments (for example, C.I. Pigment Violet 29), anthraquinone pigments (for example, C.I. Pigment Violet 5:1, 31 and 33) and thioindigo pigments (for example, C.I. Pigment Red 38 and 88).

Preferred examples of the yellow pigments include azo pigments (preferred are monoazo pigment type C.I. Pigment Yellow 1, 3, 74 and 98, disazo pigment type C.I. Pigment Yellow 12, 13, 14, 16, 17 and 83, synthetic azo type C.I. Pigment Yellow 93, 94, 95, 128 and 155 and benzimidazolone type C.I. Pigment Yellow 120, 151, 154, 156 and 180, of which pigments not using a benzidine compound as a raw material are particularly preferred), isoindoline·isoindolinone pigments (preferred are C.I. Pigment Yellow 109, 110, 137 and 139), quinophthalone pigments (preferred is C.I. Pigment Yellow 138) and flavanthrone pigments (for example, C.I. Pigment Yellow 24).

Preferred examples of the black pigment include inorganic pigments (preferred are carbon black and magnetite) and aniline black.

Besides, orange pigments (C.I. Pigment Orange 13 and 16, etc.) and green pigments (C.I. Pigment Green 7, etc.) may be used.

Pigments usable for the ink of the invention may be the above-mentioned bare pigments or surface-treated pigments. Various methods can be considered as a surface treating method, for example, a method of coating the surface of a pigment with a resin or wax, a method of adhering a surfactant to the surfaces of a pigment and a method of bonding a reactive substance (for example, a silane coupling agent or a radical generated from an epoxy compound, polyisocyanate or diazonium salt) to the surface of a pigment. Such methods can be found in the following literatures and patents:

(1) Kinzoku Sekken no Seishitsu to Oyo (Properties and Application of Metal Soap (Saiwai Shobo)

(2) Insatsu Ink Insatsu (Printing Ink Printing) (CMC Shuppan, 1984)

(3) Saishin Ganryo Oyo Gijutsu (The Newest Application Techniques of Pigments) (CMC Shuppan, 1986)

(4) U.S. Pat. Nos. 5,554,739 and 5,571,311

(5) Japanese Patent Laid-Open Nos. 151342/1998, 140065/1998, 292143/1998 and 166145/1999

In particular, self-dispersible pigments prepared by allowing a diazonium salt to act on carbon black as described in the U.S. patents (4) and capsulated pigments prepared by the methods described in the Japanese patents (5) are particularly effective, because dispersion stability is available without use of an excess dispersing agent in ink.

In the ink of the invention, the pigment may have been dispersed further by a dispersing agent. As the dispersing agent, usable are various known dispersing agents, for example, surfactant type low-molecular dispersing agents and high-molecular type dispersing agents, depending on the pigment used. Examples of the dispersing agents include those described in Japanese Patent Laid-Open No. 69949/1992 and European Patent No. 549486. Upon use of the dispersing agent, a pigment derivative called synergist may be added for enhancing adsorption of the dispersing agent to the pigment.

The particle size of the pigment usable for the ink of the invention preferably falls within a range of from 0.01 µm to 10 µm after dispersion, more preferably from 0.05 µm to 1 µm.

As a method for dispersing the pigment, known dispersing techniques employed for ink or toner production are usable. Examples of the dispersing machine include a vertical or horizontal agitator mill, an attritor, a colloid mill, a ball mill, a triple roll mill, a pearl mill, a super mill, an impeller, a disperser, a KD mill, a dynatron and a pressure kneader. Details thereof are described in "Saishin Ganryo Oyo Gijutsu" (The Newest Application Techniques of Pigments) (CMC Shuppan, 1986).

The inkjet recording ink of the invention further comprises a metal chelating agent in the ink composition. The term "metal chelating agent" means a compound having at least two donor atoms in the molecule bonded to a metal ion and capable of forming a metal ion complex.

Various compounds are known as such compound.

Examples include aliphatic or aromatic carboxylic acids, dicarboxylic acids and carboxylic acids having, on the molecule thereof, at least three carboxylic acids, oxycarboxylic acids, ketocarboxylic acids, thiocarboxylic acids, aromatic aldehydes, amine compounds, diamine compounds, polyamine compounds, aminopolycarboxylic acids, nitrilotriacetic derivatives, ethylenediaminepolycarboxylic acids, amino acid, heterocyclic carboxylic acids, heterocycles, pyrimidines, nucleosides, purine bases, β-diketones, and oxines. Of these, ethylenediaminepolycarboxylic acids and chelating agents whose lone pair on the nitrogen atom is capable of acting as a donor are particularly preferred.

Examples of such a compound include, not limited thereto, pyridine-2-carboxylic acid, pyridine-2,3-dicarboxylic acid, pyridine-2,4-dicarboxylic acid, pyridne-2,6-dicarboxylic acid, iminodiacetic acid <IDA>, iminodipropionic acid, N-methyliminodiacetic acid, N,N'-ethylenediaminediacetic acid <EDDA>, ethylenediaminetetraacetic acid <EDTA>, ethylenediamine-N,N'-(diacetic acid)-N,N'-dipropionic acid <EDPA>, ethylenediaminetetrapropionic acid <EDTP), 1,2-propylenediaminetetraacetic acid <PDTA), trimethylenediaminetetraacetic acid <THTA>, tetramethylenediaminetetraacetic acid, pentamethylenediaminetetraacetic acid, hexamethylenediaminetetraacetic acid, octamethylenediaminetetraacetic acid, 1,2-cyclopentanediaminetetraacetic acid, trans-cyclohexane-1,2-diaminetetraacetic acid <CDTA>, 1,3,5-triaminocyclohexanehexaacetic acid (CTHA>, ethyletherdiaminetetraacetic acid [2,2-oxybis(ethyliminodiacetic acid)] <E-EDTA>, diethylenetriaminepentaacetic acid <DTPA>, glycoletherdiaminetetraacetic acid <GEDTA>, trimethylenetetraminehexaacetic acid <TTHA>, quinoline-2-carboxylic acid, quinoline-8-carboxylic acid, 8-hydroxysinoline, 1,10-phenanthroline, 2-methyl-1,10-phenanthroline <70>, 5-methyl-1,10-phenanthroline, 2,9-dimethyl-1,10-phenanthroline, and 4,7-dimethyl-1,10-phenanthroline.

The chelating agent is added to the ink composition of the invention in an amount of 0.01 to 100 mol, preferably from 0.05 to 50 mol, especially preferably from 0.1 to 10 mol times the amount of the azo dye.

The inkjet recording ink of the invention can be prepared by dissolving or dispersing, in an aqueous medium, the black dye(s) of the invention and an organic solvent, and preferably a surfactant. The term "aqueous medium" as used herein means water or a mixture obtained by adding, to water, a solvent such as water miscible organic solvent, a humectant, a stabilizer, an antiseptic and/or the like component as needed.

When the dye is soluble in water, the ink solution of the invention is preferably prepared by dissolving it in water first. Then, various solvents and additives are added, dissolved and mixed to prepare a uniform ink solution.

For dissolution, various methods such as stirring, ultrasonic exposure and shaking are usable, of which stirring is particularly preferred. The stirring method includes fluid agitation known per se in the art, and stirring making use of shearing force, for example, caused by reversing agitator or dissolver. The stirring method using a shearing force with the bottom surface of a container, for example, a magnetic stirrer is also preferred.

Addition of a surfactant to the inkjet recording ink of the invention to control the physical properties of the ink solution brings about excellent effects such as improvement in discharge stability of the ink, improvement in the water resistance of the image, and prevention of the blur of the printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Of these, nonionic surfactants are especially preferred.

The surfactant is added in an amount of from 0.001 to 20 wt. %, preferably from 0.005 to 10 wt. %, more preferably from 0.01 to 5 wt. % of the ink.

Examples of the water miscible organic solvent usable in the invention include alcohols (such as methanol, ethanol, propanol, isopropanol, butanol, isobutanol, sec-butanol, t-butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethylether acetate, triethylene glycol monomethyl ether, triethylene glycol monoethyl ether and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine) and the other polar solvents (ex. formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). At least two of these water miscible organic solvents may be used in combination.

The water miscible organic solvents are added to the ink preferably in a total amount of from 5 to 60 wt. %, especially preferably from 10 to 45 wt. % of the ink.

When the black dye(s) of the invention are each an oil soluble dye, the ink of the invention can be prepared by dissolving the oil soluble dye in a high-boiling-point organic solvent and then dispersing and emulsifying the resulting solution in an aqueous medium.

The high-boiling point organic solvent to be used in the invention has a boiling point of 150° C. or greater, preferably 170° C. or greater.

Examples include phthalate esters (such as dibutyl phthalate, dioctyl phthalate, dicyclohexyl phthalate, di-2-ethylhexyl phthalate, decyl phthalate, bis(2,4-di-tert-amylphenyl) isophthalate, and bis(1,1-diethylpropyl) phthalate), phosphate or phosphonate esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoate esters (such as 2-ethylhexyl benzoate, 2,4-dichlorobenzoate, dodecyl benzoate, and 2-ethylhexyl-p-hydroxy benzoate), amides (such as N,N-diethyldodecanamide and N,N-diethyllaurylamide), alcohols or phenols (such as isostearyl alcohol and 2,4-di-tert-amylphenol), aliphatic esters (such as dibutoxyethyl succinate, di-2-ethylhexyl succinate, 2-hexyldecyl tetradecanoate, tributyl citrate, diethyl azelate, isostearyl lactate and trioctyl citrate), aniline derivatives (such as N,N-dibutyl-2-butoxy-5-tert-octylaniline), chlorinated paraffins (such as paraffins having a chlorine content of from 10 to 80%), trimesate esters (such as tributyl trimesate), dodecyl benzene, diisopropyl naphthalene, phenols (such as 2,4-di-tert-amylphenol, 4-dodecyloxyphenol, 4-dodecyloxycarbonylphenol and 4-(4-dodecyloxyphenylsulfonyl)phenol), carboxylic acids (such as 2-(2,4-di-tert-amylphenoxybutyric acid and 2-ethoxyoctanedacanoic acid), and alkylphosphoric acids (such as di-2(ethylhexyl)phosphoric acid and diphenylphosphoric acid). These high-boiling-point organic solvents may be used in an amount of from 0.01 to 20 times the mass, preferably from 0.01 to 1.0 time the mass of the oil soluble dye.

These high-boiling-point organic solvents may be used either singly or as a mixture of several solvents [for example, tricresyl phosphate and dibutyl phthalate, trioctyl phosphate and di(2-ethylhexyl)sebacate, or dibutyl phthalate and poly(N-t-butyl acrylamide)].

The other compounds serving as a high-boiling-point organic solvent and/or synthesizing processes thereof, each usable in the invention, are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, or 5,013,639; European Patent No. 276,319A, 286,253A, 289,820A, 309,158A, 309,159A, 309,160A, 509,311A, or 510,576A; East German Patent No. 147,009, 157,147, 159,573, or 225,240A; British Patent No. 2,091,124A; Japanese Patent Laid-Open No. 47335/1973, 26530/1975, 25133/1976, 26036/1976, 27921/1976, 27922/1976, 149028/1976, 46816/1977, 1520/1978, 1521/1978, 15127/1978, 146622/1978, 91325/1979, 106228/1979, 118246/1979, 59464/1980, 64333/1981, 81836/1981, 204041/1984, 84641/1986, 118345/1987, 247364/1987, 167357/1988, 214744/1988, 301941/1988, 9452/1989, 9454/1989, 68745/1989, 101543/1989, 102454/1989, 792/1990, 4239/1990, 43541/1990, 29237/1992, 30165/1992, 232946/1992 or 346338/1992.

The above-described high-boiling-point organic solvents may be used in an amount of from 0.01 to 3.0 times the mass, preferably from 0.01 to 1.0 time the mass of the oil soluble dye.

In the invention, the oil soluble dye and high-boiling-point organic solvent are dispersed and emulsified in an aqueous medium. Upon emulsification and dispersion, a low-boiling-point organic solvent is usable from the viewpoint of emulsifying properties. The low-boiling-point organic solvent is an organic solvent having a boiling point of 30° C. or greater but not greater than 150° C. under normal pressure. Preferred examples include, but not limited to, esters (such as ethyl acetate, butyl acetate, ethyl propionate, β-ethoxyethyl acetate and methyl cellosolve acetate), alcohols (such as isopropyl alcohol, n-butyl alcohol and secondary butyl alcohol), ketones (such as methyl isobutyl ketone, methyl ethyl ketone and cyclohexanone), amides (such as dimethylformamide and N-methylpyrrolidone) and ethers (such as tetrahydrofuran and dioxane).

Emulsification and dispersion are conducted for the purpose of forming fine oil droplets of an oil phase by dispersing, in an aqueous phase composed mainly of water, an oil phase having a dye dissolved in a high-boiling-point organic solvent, in some cases, in a mixed solvent thereof with a low-boiling-point organic solvent. At this time, to either one of the aqueous phase or oil phase or both of them, an additive such as surfactant, humectant, dye stabilizer, emulsion stabilizer, antiseptic and/or antifungal agent may be added as needed.

Emulsification is usually conducted by adding an oil phase to an aqueous phase. Alternatively, so-called phase inversion emulsification wherein an aqueous phase is added dropwise to an oil phase can be preferably employed. The above-described emulsifying method is applicable even in the case where the black dye(s) of the invention is water soluble and additives are oil soluble.

Various surfactants can be employed when dispersion and emulsification are carried out. Preferred examples include anionic surfactants such as fatty acid salts, alkyl sulfates, alkylbenzene sulfonates, alkylnaphthalene sulfonates, dialkyl sulfosuccinates, alkyl phosphates, naphthalenesulfonic acid-formalin condensate, and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene oxypropylene block copolymers. Also, "SURFYNOLS" (trade name; product of Air Products & Chemicals) which are acetylene series polyoxyethylene oxide surfactants are preferably employed. Amine oxide type amphoteric surfactants such as N,N-dimethyl-N-alkylamine oxides are also preferred. Moreover, surfactants as described in Japanese Patent Laid-Open No. 157,636/1984 (pp. 37–38), and Research Disclosure No. 308119 (1989) are also usable.

In order to stabilize the emulsion rightly after emulsification, a water soluble polymer can be added in combination with the surfactant. As the water soluble polymer, polyvinyl alcohol, polyvinyl pyrrolidone, polyethylene oxide, polyacrylic acid and polyacrylamide, and copolymers thereof are preferred. Natural water-soluble polymers such as polysaccharides, casein and gelatin are also preferred. In order to stabilize the dispersion of a dye, it is possible to use, in combination, polyvinyl, polyurethane, polyamide, polyurea or polycarbonate available by the polymerization of an acrylate ester, methacrylate ester, vinyl ester, acrylamide, methacrylamide, olefin, styrene, vinyl ether, or acrylonitrile, which polymer is substantially insoluble in an aqueous medium. These polymers preferably contain —$SO_3^-$ or —$COO^-$. When such a polymer substantially insoluble in an aqueous medium is used in combination, it is used preferably in an amount not greater than 20 wt. %, more preferably not greater than 10 wt. %, based on the high-boiling-point organic solvent.

When an aqueous ink is prepared by dispersing and emulsifying an oil soluble dye and high-boiling-point organic solvent, control of the size of the dispersed particles is of particular importance. It is essential to minimize the average particle size in order to heighten color purity or density upon formation of an image by inkjet. The volume-average particle size is preferably 1 μm or less, more preferably 5 to 100 nm.

The volume average particle size and particle size distribution of the dispersed particles can be measured readily in a known manner, for example, the static light scattering method, dynamic light scattering method, centrifugal precipitation method or the method as described in "Jikken Kagaku Koza (Lectures on Experimental Chemistry)", 4th Edition, pages 417 to 418. For example, a particle size can be measured easily by diluting ink with distilled water to give the particle concentration in the ink of 0.1 to 1 wt. % and measuring the particle size of the resulting diluted ink by a commercially available volume-average particle size measuring instrument (for example, "Microtrac UPA" (trade name; product of Nikkiso Co., Ltd.). The dynamic light scattering method using Laser Doppler effect permits measurement of even a small particle size so that it is especially preferred.

The volume-average particle size is an average particle size based on the volume of the particles and it is found by multiplying the diameter of each particle by its volume and then dividing the sum of the products by the total volume of the particles. There is a description about the volume-average particle size on page 119 of "Kobunshi Latex no Kagaku (Chemistry of High Molecular Latex)" (written by Soichi Muroi, published by Kobunshi Kankokai).

It has been revealed that the existence of coarse particles plays an important role in printing performance. Described specifically, coarse particles cause clogging of a head nozzle or, if not so, form a stain and prevent discharge or cause irregular discharge of the ink, thereby having a serious influence on the printing performance. To prevent such phenomena, it is important to control the number of the particles having a particle size of 5 μm or greater to 10 or less and the number of the particles having a particle size of 1 μm or greater to 100 or less, each in 1 μl of the resulting ink.

Such coarse particles can be removed by the known method such as centrifugal separation or precise filtration. Separation by these methods may be effected rightly after dispersion and emulsification, or after addition of various components such as humectant and surfactant to the emulsified dispersion but rightly before filling a cartridge with the mixture.

A mechanical emulsifying apparatus can be employed as effective means for decreasing the average particle size and removing coarse particles.

As the emulsifying machine, usable are known ones such as simple-system stirrer, mill-system apparatuses such as impeller agitator, inline agitator and colloid mill and ultrasonic system apparatus, with the use of a high pressure homogenizer being especially preferred.

Specific mechanism of a high pressure homogenizer is described in U.S. Pat. No. 4,533,254 or Japanese Patent Laid-Open No. 47264/1994. Examples of the commercially available one include Gaulin homogenizer (product of A.P.V GAULIN INC), microfluidizer (product of MICROFLUIDEX INC.) and Ultimaizer (product of Sugino Machine).

A recently developed high pressure homogenizer as described in U.S. Pat. No. 5,720,551 having a mechanism for forming fine particles in a ultrahigh pressure jet stream is particularly effective for dispersion and emulsification of the invention. "DeBEE 2000" (product of BEE INTERNATIONAL LTD.) is one of the emulsifying apparatuses adopting this ultrahigh pressure jet stream.

The pressure upon emulsification by a high pressure emulsifying apparatus is at least 50 MPa, preferably at least 60 MPa, still more preferably at least 180 MPa.

Use of at least two emulsifying apparatuses, for example, successive use of a stirring emulsifier and a high pressure homogenizer is particularly preferred. It is also preferred to disperse and emulsify by these emulsifying apparatuses, add to the resulting emulsion a component such as humectant or surfactant and subject the resulting mixture to the high pressure homogenizer again while filling a cartridge with the resulting ink.

When both of a high boiling point organic solvent and a low boiling point organic solvent are incorporated, removal of the low boiling point solvent is preferred in view of stability, safety and sanitation of the emulsion. The low boiling point solvent can be removed in a known manner, for example, evaporation, vacuum evaporation or ultrafiltration, depending on the kind of the solvent. This removal of the low boiling point organic solvent is preferably conducted as soon as possible rightly after emulsification.

A process for preparing an inkjet ink is described in Japanese Patent Laid-Open No. 148436/1993, 295312/1993, 97541/1995, 82515/1995 or 118584/1995 and such a process is also applicable to the preparation of the inkjet recording ink of the present invention.

In the inkjet recording ink of the invention, functional components to impart the ink with various functions can be incorporated. Examples of the functional component include the above-described various solvents, antidrying agent for preventing clogging at a jet orifice due to drying of ink, penetration promoter to promote penetration of ink into paper, ultraviolet absorber, antioxidant, viscosity regulator, surface tension regulator, dispersant, dispersion stabilizer, antifungal agent, rust preventive, pH regulator, antifoaming agent and chelating agent. To the ink of the invention, a sufficient amount of the component selected from the above-described ones as needed can be added. These functional components embrace compounds each capable of exhibiting one or at least two functions. Accordingly, when the functions of some functional components overlap each other, the amount of the compound is included independently in the amount of each functional component.

As the antidrying agent to be used in the invention, water soluble organic solvents having a vapor pressure lower than that of water are preferred. Specific examples include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of a polyhydric alcohol such as ethylene glycol monomethyl (or ethyl) ether, diethylene glycol monomethyl (or ethyl) ether and triethylene glycol monoethyl (or butyl) ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Of these, polyhydric alcohols such as glycerin and diethylene glycol are more preferred. The above-exemplified antidrying agents may be used either singly or in combination. The antidrying agent is added preferably in an amount of from 10 to 50 wt. % of the ink.

Examples of the penetration promoter usable in the invention include alcohols such as ethanol, isopropanol, butanol, di(tri)ethylene glycol monobutyl ether, and 1,2-hexanediol and nonionic surfactants such as sodium lauryl sulfate and sodium oleate. Incorporation of it in an amount of 10 to 30 wt. % in the ink brings about sufficient effects. It is preferably added in an amount within a range causing neither blur of print nor print-through.

Examples of the ultraviolet absorber to be used in the invention for improving the storage stability of images include benzotriazole compounds as described in Japanese Patent Laid-Open Nos. 185677/1983, 190537/1986, 782/1990, 197075/1993 and 34057/1997, benzophenone compounds as described in Japanese Patent Laid-Open Nos. 2784/1971 and 194483/1993 and U.S. Pat. No. 3,214,463, cinnamic acid compounds as described in Japanese Patent Publication Nos. 30492/1973 and 21141/1981 and Japanese Patent Laid-Open No. 88106/1998, triazine compounds as described in Japanese Patent Laid-Open Nos. 298503/1992, 53427/1996, 239368/1996 and 182621/1998 and International Patent Publication No. 501291/1996, compounds as described in Research Disclosure No. 24239 and so called fluorescent brightener typified by stilbene and benzoxazole compounds which emit fluorescence, absorbing ultraviolet rays.

In the invention, as an antioxidant for improving the storage property of images, various organic and metal complex antifading agents are usable. The organic antifading agents include hydroquinones, alkoxyphenols, dialkoxyphenols, phenols, anilines, amines, indanes, chromans, alkoxyanilines and heterocycles. The metal complex antifading agents include nickel complexes and zinc complexes. More specifically, compounds described in patents cited in Research. Disclosure No. 17643, VII, items I to J; No. 15162; No. 18716, page 650, left column; No.36544, page 527; No. 307105, page 872; and No. 15162, as well as the compounds included in the general formulas of typical compounds and in compound examples described in Japanese Patent Laid-Open No. 215272/1987, pages 127 to 137.

Examples of the antifungal agents usable in the invention include sodium dehydroacetate, sodium benzoate, sodium pyridinethion-1-oxide, ethyl p-hydroxybenzoate and 1,2-benzisothiazolin-3-one and salts thereof. It is preferably added in an amount of from 0.02 to 5.00 wt. % of the ink.

Details of the antifungal agent are described in "Bokin Bokabizai Jiten (Dictionary of Antibacterial and Antifungal Agents)" (ed. by Editorial Committee of The Society for Antibacterial and Antifungal Agents, Japan).

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. It is preferably added in an amount of from 0.02 to 5.00 wt. % in the ink.

The pH regulator to be used in the invention is useful for regulating pH of the ink and imparting it with dispersion stability. The pH of the ink at 25° C. is preferably adjusted to 8 to 11. The ink having a pH less than 8 tends to cause clogging of a nozzle owing to a deterioration in solubility of the dye. The ink having a pH exceeding 11, on the other hand, tends to have lowered water resistance. Examples of the basic pH regulator include basic ones such as organic bases and inorganic alkalis, and acidic ones such as organic acids and inorganic acids.

Specific examples of the basic compound include inorganic ones such as sodium hydroxide, potassium hydroxide, sodium carbonate, potassium carbonate, sodium hydrogencarbonate, potassium hydrogencarbonate, sodium acetate, potassium acetate, sodium phosphate and sodium monohydrogenphosphate, and organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

Specific examples of the acidic compounds include inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate, and organic compounds such as acetic acid, tartaric acid, benzoic acid, trifluoroacetic acid, methanesulfonic acid, ethanesulfonic acid, benzenesulfonic acid, p-toluenesulfonic acid, saccharic acid, phthalic acid, picolinic acid and quinolinic acid acid.

The conductivity of the ink of the invention falls within a range of from 0.01 to 10 S/m, of which conductivity ranging from 0.05 to 5 S/m being preferred.

The conductivity can be measured by the electrode method using commercially available saturated potassium chloride.

The conductivity can be controlled mainly by an ion concentration in an aqueous solution. When the salt concentration is high, desalting can be effected by using an ultrafiltration membrane. When a salt is added for controlling the conductivity, on the other hand, various salts of an organic substance or inorganic substance are usable.

As the salts of an inorganic substance, usable are inorganic compounds such as potassium halides, sodium halides, sodium sulfate, potassium sulfate, sodium hyrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate. In addition, organic compounds such as sodium acetate, potassium acetate, potassium tartrate, sodium tartrate, sodium benzoate, potassium benzoate, sodium p-toluenesulfonate, potassium saccharate, potassium phthalate and sodium picolinate are usable.

The conductivity can also be adjusted by selecting the component of an aqueous medium which will be described later.

The ink of the invention preferably has a viscosity at 25° C. of from 1 to 20 mPa·s, more preferably from 2 to 15 mPa·s, especially preferably from 2 to 10 mPa·s. The viscosities exceeding 20 mPa·s lower the fixing rate of images to be recorded and deteriorates the discharge performance. The viscosities less than 1 mPa·s, on the other hand, cause blur of recorded images, leading to a quality deterioration.

The viscosity can be regulated freely by controlling the amount of an ink solvent. Examples of the ink solvent include glycerin, diethylene glycol, triethanolamine, 2-pyrrolidone, diethylene glycol monobutyl ether and triethylene glycol monobutyl ether.

A viscosity regulator is also usable. Examples of the viscosity regulator include water soluble polymers such as cellulose derivatives and polyvinyl alcohol, and nonionic surfactants. A more specific description about viscosity regulators can be found in "Nendo Chosei Gijutsu (Viscosity Regulating Technique)", Chapter 9 (Information Technology Association, 1999) and "Inkujetto Printa yo Kemikaruzu (Chemicals for Inkjet Printers) (Supplement, 98)—Zairyo no Kaihatsu Doko•Tenbo Chosa (Researches on Development Trend and Prospect of Materials)—", pages 162 to 174 (CMC, 1997)).

A method of measuring the viscosity of a liquid is described in detail in JIS Z8803, but it can be conveniently measured by a commercially available viscometer. For example, Model B viscometer and model E viscometer of Tokyo Keiki can be given as examples of a rotary viscometer. In the invention, "VM-100A-L", an vibration type viscometer of Yamaichi Electronics Co., Ltd. was employed for viscosity measurement at 25° C. The unit of the viscosity is pascal second (Pa·s), but millipascal second (mPa·s) is usually employed.

With regards to the surface tension of the ink used in the invention, either dynamic or static surface tension preferably ranges from 20 to 50 mN/m at 25° C., with a range of from 20 to 40 mN/m being more preferred. The surface tension exceeding 50 mN/m impairs discharge stability and causes marked deteriorations in print quality such as blur upon color mixing and whisker. When the surface tension of the ink is adjusted to less than 20 mN/m, adhesion of the ink to the surface of hardwares happens to occur, leading to printing failure.

In order to adjust surface tension, various surfactants such as the above-described cationic, anionic, nonionic and betaine surfactants can be added. As the surfactant, at least two of them can be used in combination.

Although as a method for measuring static surface tension, the capillary rise method, dropping method and ring method are known, the vertical plate method is employed in the invention as the method for measuring static surface tension. When a thin glass or platinum plate is hung vertically while being partially immersed in a liquid, surface tension of the liquid works downward along the length of the plate brought into contact with the liquid. Surface tension can be measured by balancing this downward force with an upward force.

As a measuring method of dynamic surface tension, known are vibrating jet method, meniscus drop method, and maximum bubble pressure method as described in "Shinjikken Kagaku Koza (New Lectures on Experimental Chemistry), Vol. 18, Kaimen to Koroido (Interface and Colloid)", pages 69 to 90, published by Maruzen Co., Ltd (1977). Also known is the liquid film breakup method as described in Japanese Patent Laid-Open No. 2064/1991. In the invention, the bubble pressure difference method is employed for measuring dynamic surface tension. The principle and method of measurement will next be described.

When air bubbles are formed in a uniform solution obtained by stirring, a new air-liquid interface is formed and surfactant molecules in the solution gather onto the surface of water at a fixed rate. The smaller a bubble rate (bubble formation rate) becomes, the more surfactant molecules gather onto the surface of the bubbles, which lowers the maximum bubble pressure rightly before the burst of the bubbles. Thus, the maximum bubble pressure (surface tension) relative to the bubble rate can be detected. As a method of measuring dynamic surface tension, preferred is a method of forming bubbles in a solution by using two probes different in size, measuring a pressure differential between two probes under the maximum bubble pressure condition, and calculating dynamic surface tension.

The amount of nonvolatile components in the ink of the invention is preferably 10 to 70 wt. % of the total amount of the ink in view of discharge stability of the ink, fastness of images against various factors, and reduction in the blur of printed images and sticky feel on the printed surface. It is more preferably 20 to 60 wt. % in view of the discharge stability of ink and reduction in blur of the printed images.

The "nonvolatile components" as used herein means liquid, solid and polymer components having a boiling point of 150° C. or greater at 1 atom. The nonvolatile components of inkjet ink include dye, high-boiling-point solvent, and polymer latex, surfactant, dye stabilizer, antifungal agent and buffer to be added as needed. Many of these nonvolatile components except the dye stabilizer lower dispersion stability of the ink. These components which continue to exist on inkjet image-receiving paper even after printing disturb stabilization of the dye, which will otherwise be brought by association, on the receiving paper, thereby impairing fastness of the image portion and worsening blur of the image under high humidity condition.

To the ink of the invention, a polymer compound can be added. The term "polymer compound" as used herein means all the polymer compounds which are contained in the ink and have a number average molecular weight of 5000 or greater. Examples of these polymer compounds include water soluble polymer compounds substantially soluble in an aqueous medium, water dispersible polymer compounds such as polymer latex and polymer emulsion, and alcohol soluble polymer compounds soluble in a polyhydric alcohol to be used as an auxiliary solvent. Polymer compounds substantially soluble or dispersible uniformly in an ink solution are all embraced in the polymer compounds of the invention.

Specific examples of the water soluble polymer compound include water soluble polymers such as polyvinyl alcohol, silanol-modified polyvinyl alcohol, carboxymethyl cellulose, hydroxyethyl cellulose, polyvinyl pyrrolidone, polyalkylene oxides, e.g., polyethylene oxide and polypropylene oxide, and polyalkylene oxide derivatives, natural water soluble polymers such as polysaccharides, starch, cationized starch, casein and gelatin, water-based acrylic resins such as polyacrylic resin, polyacrylamide and copolymers thereof, water-based alkyd resins, and water soluble polymer compounds having, in the molecule thereof, —$SO^3$— or —$COO^-$ group and substantially soluble in an aqueous medium.

Examples of the polymer latex include styrene-butadiene latex, styrene-acrylic latex and polyurethane latex, while those of the polymer emulsion include acrylic emulsion. At least two of these water soluble polymer compounds can be used in combination.

As described above, the water soluble polymer compound is used as a viscosity regulator for adjusting the viscosity of the ink to fall within a viscosity range permitting good discharge properties. Excessive addition of it however heightens the viscosity of the ink, thereby lowering discharge stability of the ink solution. With the passage of time, a nozzle tends to be clogged with the precipitate of it.

Although the amount of the polymer compound as a viscosity regulator varies, depending on the molecular weight of the compound added (the higher the molecular weight, the smaller the amount), it is added in an amount of from 0 to 5 wt. %, preferably from 0 to 3 wt. %, more preferably from 0 to 1 wt. %, based on the total weight of the ink.

In the invention, as a dispersant or dispersion stabilizer, various surfactants such as the above-described cationic, anionic, nonionic and betaine surfactants, and as an antifoaming agent; fluorine or silicone compounds and chelating agents typified by EDTA can be used as needed.

Reflective type media to be used in the present invention will next be described. Examples of the reflective type media include recording paper and recording film. As recording paper and recording film, usable are those having, as a support, chemical pulp such as LBKP or NBKP, mechanical pulp such as GP, PGW, RMP, TMP, CTMP, CMP or CGP, or recycled pulp such as DIP; and having conventionally known additives such as pigment, binder, sizing agent, fixer, cationic agent and paper strength agent mixed therein as needed; and made using paper machine such as wire paper machine or cylinder paper machine. Alternatively, the support may be either synthetic paper or plastic film sheet and it preferably has a thickness of from 10 to 250 μm and a basis weight of 10 to 250 g/m$^2$.

The support itself may be used as a receiving material of the ink of the invention after disposing thereon an image receiving layer and back coat layer, or after disposing a size press or anchor coat layer by using starch or polyvinyl alcohol and then disposing thereon an image receiving layer and a back coat layer. The support may further be subjected to flattening treatment by a calendering machine such as machine calender, TG calender or soft calender.

In the invention, paper or a plastic film having both sides thereof laminated with polyolefin (ex. polyethylene, polystyrene, polybutene, or copolymer thereof) or polyethylene terephthalate is preferably employed as the support. Addition of a white pigment (ex. titanium oxide or zinc oxide) or a tinting dye (ex. cobalt blue, ultramarine or neodymium oxide) to polyolefin is preferred.

In the image receiving layer to be disposed on the support, a porous material and an aqueous binder are incorporated. The image receiving layer preferably contains a pigment, preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate and organic pigments such as styrene pigments, acrylic pigments, urea resins and melamine resins. As the white pigment, porous white inorganic pigment, particularly, synthetic amorphous silica having a large pore area is preferred. As the synthetic amorphous silica, either silicic anhydride available by the dry process (vapor phase) or hydrated silicic acid available by the wet process is usable.

Specific examples of the recording paper having the above-described pigment contained in the image receiving layer include Japanese Patent Laid-Open Nos. 81064/1998, 119423/1998, 157277/1998, 217601/1998, 348409/1999, 2001-138621, 2000-43401, 2000-211235, 2000-309157, 2001-96897, 2001-138627, 91242/1999, 2087/1996, 2090/1996, 2091/1996, 2093/1996, 174992/1996, 192777/1999 and 2001-301314.

Examples of the aqueous binder contained in the image receiving layer include water soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivatives and water-dispersible polymers such as styrene butadiene latex and acrylic emulsion. These aqueous binders may be used either singly or in combination. Of them, polyvinyl alcohol and silanol-modified polyvinyl alcohol are particularly preferred from the viewpoints of adhesion to the pigment and peel resistance of the ink receiving layer.

The image receiving layer may contain, in addition to, the pigment and aqueous binder, a mordant, a water proofing agent, a light resistance improver, a surfactant, a hardener and the other additives.

The mordant to be added to the image receiving layer is preferably immobilized. A polymeric mordant is preferably employed for this purpose.

Polymeric mordants are described in Japanese Patent Laid-Open Nos. 28325/1973, 74430/1979, 124726/1979, 22766/1980, 142339/1980, 23850/1985, 23851/1985, 23852/1985, 23853/1985, 57836/1985, 60643/1985, 118834/1985, 122940/1985, 122941/1985, 122942/1985, 235134/1985 and 161236/1989, and U.S. Pat. Nos. 2,484, 430, 2,548,564, 3,148,061, 3,309,690, 4,115,124, 4,124,386, 4,193,800, 4,273,853, 4,282,305 and 4,450,224. Image receiving materials containing the polymeric mordant as described in Japanese Patent Laid-Open 161236/1989, pages 212 to 215 are particularly preferred. Use of these polymeric mordants makes it possible to form an image having excellent image quality and improved light resistance.

A water proofing agent is effective for improving water resistance of an image and as this agent, cationic resins are particularly desired. These cationic resins include polyamide polyamine epichlorohydrin, polyethyleneimine, polyaminesulfone, dimethyldiallyl ammonium chloride polymer, and cation polyacrylamide. The cationic resin is preferably added in an amount of from 1 to 15 wt. %, particularly from 3 to 10 wt. % based on the whole solid content of the ink receiving layer.

Examples of the light resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinic acid compounds, saccharides, water soluble reductive compounds, organic acids, inorganic acids, hydroxy-containing organic acids, benzotriazole compounds, benzophenone compounds, triazine compounds, heterocyclic compounds, water soluble metal salts, organic metal compounds and metal complexes.

Specific examples of these compounds are described, for example, in Japanese Patent Laid-Open Nos. 182621/1998, 2001-260519, and 2000-260519, Japanese Patent Publication No. 34953/1992, 34513/1992, and 34512/1992, Japanese Patent Laid-Open No. 170686/1999, 67190/1985, 276808/1995, 2000-94829, International Patent Publication No. 512258/1996, and Japanese Patent Laid-Open No. 321090/1999.

The surfactant functions as a coating aid, peeling improver, slip improver or antistatic agent. Description on it can be found in Japanese Patent Laid-Open Nos. 173463/1987 and 183457/1987.

Instead of the surfactant, organofluoro compounds may be employed. They are preferably hydrophobic. Examples include fluorine surfactants, oily fluorine compounds (ex. fluorine oil) and solid fluorine compound resins (ex. ethylene tetrafluoride resin). Organofluoro compounds are described in Japanese Patent Publication No. 9053/1982 (8th to 17th columns), and Japanese Patent Laid-Open No. 20994/1986 and 135826/1987.

As the hardener, materials as described on page 222 of Japanese Patent Laid-Open No. 161236/1989, Japanese Patent Laid-Open No. 263036/1997, Japanese Patent Laid-Open No. 119423/1998, or Japanese Patent Laid-Open No. 2001-310547 are usable.

As the other additives to the image receiving layer, pigment dispersants, thickeners, antifoaming agents, dyes, fluorescent brighteners, antiseptics, pH regulators, matting agents and hardeners can be used. The ink receiving layer may be a single layer or a double layer.

The recording paper or recording film may have a back coat layer disposed thereon. To this layer, white pigments, aqueous binders and the other components can be added.

Examples of the white pigment to be incorporated in the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, litopone, zeolite, hydrated halloysite, magnesium carbonate and magnesium hydroxide, and organic pigments such as styrene plastic pigment, acrylic plastic pigment, polyethylene, microcapsules, urea resins and melamine resins.

As the aqueous binder to be incorporated in the back coat layer, usable are water soluble polymers such as styrene/maleate salt copolymers, styrene/acrylate salt copolymers, polyvinyl alcohol, silanol-modified polyvinyl alcohol, starch, cationized starch, casein, gelatin, carboxymethyl cellulose, hydroxyethyl cellulose and polyvinylpyrrolidone, and water dispersible polymers such as styrene butadiene latex and acrylic emulsion. Examples of the other component to be incorporated in the back coat layer include antifoaming agent, foaming inhibitor, dye, fluorescent brightener, antiseptic and water proofing agent.

To layers (including back layer) constituting the inkjet recording paper or recording film, a fine particle dispersion of a polymer may be added. It is used in order to improve the physical properties of a film, for example, stabilizing size and preventing curling, adhesion and cracks. A description on the fine particle dispersion of a polymer can be found in Japanese Patent Laid-Open Nos. 245258/1987, 136648/1987 and 110066/1987. Addition of a fine particle dispersion of a polymer having a low glass transition point (40° C. or lower) to a mordant-containing layer enables to prevent occurrence of cracks or curing of the layer. Addition of a fine particle dispersion of a polymer having a high glass transition point to the back layer also prevents occurrence of its curling.

There is no limitation on the inkjet recording system to be applied to the ink of the invention and the ink is used in the known recording systems such as a charge control system in which ink is ejected by making use of electrostatic induction power, drop-on-demand system (pressure pulse system) making use of oscillation pressure of a piezoelectric element, acoustic ink-jet system in which ink is exposed to acoustic beams converted from electric signals and is discharged utilizing a radiation pressure, and thermal ink-jet (bubble jet) system in which ink is heated to form bubbles and the pressure thus generated is utilized.

Ink-jet recording systems include a system of jetting a number of small droplets of photoink, that is, ink having a low density, a system of improving image quality by using a plurality of inks having substantially the same hue but different concentrations and a system of using a colorless transparent ink.

The inkjet recording ink of the invention can be used for various purposes in addition to inkjet recording. It can be used, for example, as display image materials, image forming materials of an interior decoration material, and image forming materials of an exterior decoration material.

Examples of the display image materials include images drawn or attached on a poster, wall paper, ornamental goods (decorative figurines and dolls), commercially advertising circulars, lapping paper, lapping materials, paper bags, plastic bags, package materials, advertising signs or on the side surface of transport facilities (car, bus, train, etc.), and clothes with logo. When the dye of the invention is used as a forming material of a display image, the term "image" embraces not only "image" in a narrow sense but also all the patterns recognizable by human beings such as abstract designs, characters and geometric patterns.

Examples of the interior decoration materials include wall paper, decorative goods (decorative figurines and dolls), members for lighting fixtures, members for furniture and design members for floor or ceiling. When the dye of the invention is used as an image forming material, the term "image" embraces not only "image" in a narrow sense but also all the patterns recognizable by human beings such as abstract designs, characters and geometric patterns.

Examples of the exterior decoration materials include wall materials, roofing materials, advertising signs, gardening materials, exterior decoration goods (decorative figurines and dolls), and members for outdoor lighting fixtures. When the dye of the invention is used as an image forming material, the term "image" embraces not only "image" in a narrow sense but also all the patterns recognizable by human beings such as abstract designs, characters and geometric patterns.

In the above-described using purposes, examples of media on which patterns are formed include paper, fibers, clothes (including nonwoven clothes), plastics, metals, and ceramics. The dye can be fixed to these media, for example, by printing, dyeing or in the form of a reactive dye having a reactive group introduced therein. Of these, mordanting is preferred.

Upon preparation of ink, ultrasonic vibration can be applied during the dissolving step of an additive such as dye.

The purpose of the ultrasonic vibration is to apply ultrasonic energy at least equal to the energy which the ink receives at a recording head during the ink preparation process, thereby removing bubbles from the ink in order to prevent bubbling which will otherwise occur owing to the pressure applied to the ink at the recording head.

The ultrasonic waves of the ultrasonic vibration have usually a vibration frequency of 20 kHz or greater, preferably 40 kHz or greater, more preferably 50 kHz or greater. The energy applied to the ink solution by ultrasonic vibration is usually $2\times10^7$ J/m$^3$ or greater, preferably $5\times10^7$ J/m$^3$ or greater, more preferably $1\times10^8$ J/m$^3$ or greater. The ultrasonic vibration is applied usually for about 10 minutes to 1 hour.

The ultrasonic vibration is effective insofar as it is applied after the dye is poured in a medium. It is also effective even if applied after the ink is stored after preparation. Application of ultrasonic vibration upon dissolving and/or dispersing the dye in the medium is preferred, because it brings about greater effects for bubble removal and at the same time, promotes dissolution and/or dispersion of the dye in the medium.

In short, a step of applying ultrasonic vibration can be conducted either during or after the dissolving and/or dispersing step of the dye in the medium. In other words, the step of applying ultrasonic vibration can be conducted at least once at any time until the ink becomes a product after preparation.

As a mode of carrying out the invention, the step of dissolving and/or dispersing the dye in an aqueous medium preferably has sub-steps of dissolving the dye in a portion of the medium and mixing the resulting solution with the remaining portion of the medium. Application of ultrasonic vibration to either one of these sub-steps is preferred, of which application of ultrasonic vibration to the former sub-step is more preferred.

The latter step of mixing the remaining portion of the solvent may be composed of one step or plural steps.

In the ink preparation according to the invention, deaeration under heat or under pressure is effective for removal of bubbles from the ink and is therefore preferred. This deaeration step under heat or under pressure is preferably conducted simultaneously or after the mixing step of the remaining portion of the solvent.

Ultrasonic vibration is generated in the ultrasonic vibration application step, for example, by known apparatuses such as ultrasonic dispersing machine.

Upon preparation of the ink of the invention, a step of removing dusts, which are solid contents, from the prepared solution through filtration is important. A barrier filter is used for the removal. The barrier filter preferably has an effective diameter of 1 µm or less, preferably from 0.05 µm or greater but not greater than 0.3 µm, especially preferably from 0.25 µm or greater but not greater than 0.3 µm. The filter made of various materials is usable. Particularly in the case of ink containing a water soluble dye, use of a filter made for a water-based solvent is preferred. Use of a filter which hardly becomes a dust source and is made of a polymer material is particularly preferred. The ink solution may be caused to pass through a filter by feeding, or either one of filtration under pressure or under reduced pressure is usable.

The solution tends to take air therein after filtration. Bubbles due to this air are sometimes causative of the distortion of images in the inkjet recording, so that it is preferred to establish the above-described bubble removing step separately. Bubble removal may be carried out by allowing the filtered solution to stand. Alternatively, a method such as ultrasonic bubble removal or vacuum bubble removal using a commercially available apparatus can be employed. When bubble removal is effected using ultrasonic waves, this operation is continued preferably for 30 seconds to 2 hours, more preferably for 5 minutes to 1 hour.

The above-described operations are preferably carried out in a space such as clean room or clean bench in order to avoid mixing of dusts in the ink solution during the operations. In the invention, a space having cleanliness of Class 1000 or lower is preferred. The term "cleanliness" as used herein means a value as measured by a dust counter.

In the invention, an ink droplet volume on recording materials is 0.1 pl or greater but not greater than 100 pl, preferably from 0.5 pl or greater but not greater than 50 pl, especially preferably from 2 pl or greater but not greater than 50 pl.

There is no limitation on the inkjet recording system in the invention, and usable are known ones such as charge control system in which ink is ejected utilizing electrostatic attracting force, drop-on-demand system (pressure pulse system) utilizing vibration pressure of piezoelectric elements, acoustic inkjet system in which ink is exposed to acoustic beams which have been converted from electric signals, and the resulting radiation pressure is used for ejection of the ink, and thermal inkjet (bubble jet) system in which bubbles are formed by heating ink and the resulting pressure is utilized for ink ejection.

The inkjet recording system includes system of ejecting small droplets of so-called photoink, that is, ink with a low density, system of using a plurality of ink compositions substantially identical in hue and different in density to improve image quality, and system using colorless and transparent ink. The ink droplet volume of the ink is controlled mainly by a print head.

For example, in the case of the thermal inkjet system, an ink droplet volume can be controlled by the structure of a print head. Described specifically, by changing the size of an ink chamber, heating part or nozzle, ink droplets of a desired size can be ejected. Even in the thermal inkjet system, ink droplets of a different size can be ejected by using a plurality of print heads different in the size of the heating part or nozzle.

In the case of the drop-on-demand inkjet system using a piezoelectric element, the ink droplet volume can be controlled by changing the structure of a print head as in the thermal inkjet system, but ink droplets of a different size can be ejected even without changing the structure of the print head, by controlling the waveform of driving signals of the piezoelectric element as described later.

In the invention, ink droplet ejection frequency of the ink to a recording material is 1 KHz or greater.

For the purpose of recording a high quality image as a photograph, the ink droplet density must be adjusted to 600 dpi (the number of dots per inch) to reproduce a highly sharp image with small ink droplets.

When ink is ejected using a head having a plurality of nozzles and recording is conducted while recording paper and the head are moved in a direction perpendicular to each other, the number of heads which can be driven simultaneously is in the dozens to 200. Even in a line head, that is, a printer having a fixed head, the number is limited to be in the hundreds, because a large number of head nozzles cannot be driven simultaneously owing to a limitation in driving power and an adverse effect of heat generation at the head on images.

A recording speed can be heightened by increasing a driving frequency.

In the case of thermal inkjet system, ink droplet ejection frequency can be controlled by controlling the frequency of head driving signals for heating the head.

In the case of the piezo system, it can be realized by the control of the frequency of a piezo driving signal.

A description will next be made of the driving of the piezo head. At the printer control part, the size of ink droplets, and speed and frequency of the ink droplet ejection are determined, whereby a driving signal of the print head is made. The driving signal is fed to the print head. By piezo driving signal, the size of the ink droplets, and speed and frequency of the ink droplet ejection are controlled. The size of ink droplets and speed of the ink droplet ejection here are determined by the shape and amplitude of the drive waveform, while the frequency is determined by the repeating cycle of signals.

When the ink droplet ejection frequency is set at 10 kHz, the head is driven at every 100 micro seconds and recording of one line is completed in 400 microseconds. By setting the transfer speed of recording paper at 1/600 inch, that is, about 42 microns per 400 microseconds, printing on recording paper can be completed in 1.2 seconds per sheet.

In the invention, the printer preferably has a structure as disclosed in Japanese Patent Laid-Open No. 170527/1999, and the ink cartridge as disclosed in Japanese Patent Laid-Open No. 229133/1994 is preferred. As suction and the constitution of a cap or the like covering a printing head upon suction, those disclosed in Japanese Patent Laid-Open No. 276671/1995 are preferred. In the vicinity of the head, a filter for removing bubbles as disclosed in Japanese Patent Laid-Open No. 277552/1997 is preferably installed.

The surface of the nozzle is preferably subjected to water repellent treatment as described in Japanese Patent Application No. 2001-016738. The printer may be connected to a computer or an apparatus exclusively used for printing of photographs.

In the inkjet recording method to be applied to the ink of the invention, inkjet recording ink obtained by dissolving and/or dispersing at least one of the black dyes of the invention in an aqueous medium is jetted to a recording material at an average ink droplet ejection speed of 2 m/sec or greater, preferably 5 m/sec greater.

The ink droplet ejection speed is controlled by controlling the shape and amplitude of the waveform for driving the head.

Ink droplets different in size can be ejected from the same head by using a plurality of driving waveforms properly.

EXAMPLES

The present invention will hereinafter be descried by Examples. It should however be borne in mind that the present invention is not limited to or by them.

Examples

To the below-described components was added ultrapure water (having a resistance of 18 MΩ or greater) to give the total amount of 1 liter. The resulting mixture was stirred for 1 hour while being heated at 30 to 40° C. The reaction mixture was then filtered via a microfilter having an average pore size of 0.25 μm under reduced pressure, whereby a black ink solution Bk-101 was prepared.

[Black Ink Bk-101 Formulation]
(Solid Content)

| | |
|---|---|
| Black dye of the invention (L: long wavelength side) (BL-1) ($\lambda$max: 589 nm, $W_{\lambda, 1/2}$: 125 nm) | 75 g/l |
| Black dye of the invention (S: short wavelength side) (BS-1) ($\lambda$max: 462 nm) | 30 g/l |
| Proxel | 5 g/l |
| Urea | 10 g/l |

-continued

| | |
|---|---|
| Benzotriazole | 3 g/l |
| (Liquid components) | |
| Diethylene glycol monobutyl ether (DGB) | 120 g/l |
| Glycerin (GR) | 125 g/l |
| Diethylene glycol (DEG) | 100 g/l |
| 2-Pyrrolidone | 35 g/l |
| Lithium hydroxide | 4 g/l |
| Surfynol STG (SW) | 10 g/l |

The oxidation potential (Eox) of each black dye (L:BL-1, S:BS-1) used in this Example was determined by the above-described measuring method and it was confirmed to be nobler than 1.0V (vs SCE).

In addition to the black ink Bk-101, black inks Bk-102 to 110 were prepared in a similar manner by using the black dyes described in Table 7 (although the main composition except the dye is similar to that of Bk-101, another additive used is shown in Table 7).

The following three dyes were employed as comparative dyes.

1) Black dye (A) on the long wavelength side having oxidation potential (Eox) of 1.0V (vs SCE) or less.
2) Black dye (B) on the long wavelength side having a half value width ($W_{\lambda,1/2}$) less than 100 nm in the spectrum normalized by a dilute solution
3) Black dye (C) on the short wavelength side having oxidation potential (Eox) of 1.0V (vs SCE) or less.

The black dye (B) on the long wavelength side had oxidation potential of 1.0 V (vs SCE) or less.

Black dyes have the following structures, respectively.

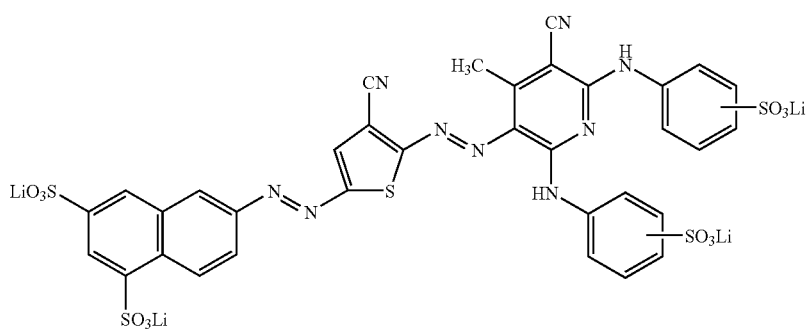

BL-1

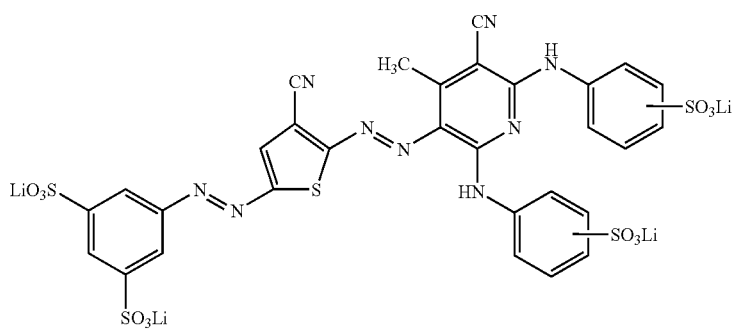

BL-2

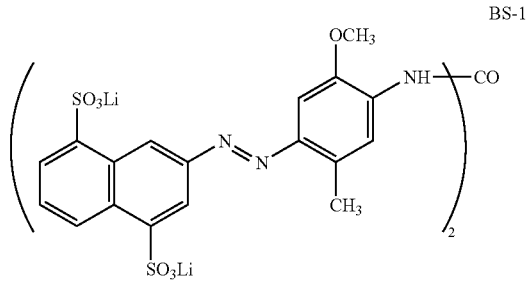

BS-1

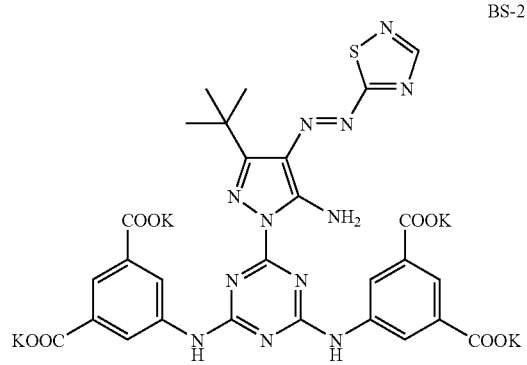

BS-2

A  C. I. FOOD BLACK 2

B  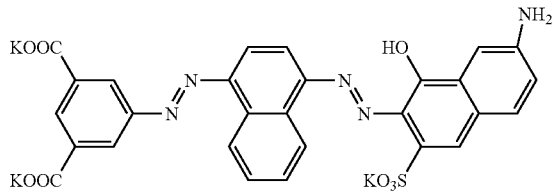

C  C. I. DIRECT YELLOW 120

The oxidation potential (Eox) of each black dye (L:BL-2, S:BS-2) was determined by the above-described measuring method and it was confirmed to be nobler than 1.0V (vs SCE). The λmax of BL-2 was 590 nm and $W_{\lambda,1/2}$ was 122 nm, while the λmax of BS-2 was 457 nm.

Black inks as shown in Table 7 were prepared using the above-described dyes.

TABLE 7

| No. | Black dye | Additive |
|---|---|---|
| PM-950C (Bk) (Comp. Ex.) | — | — |
| Bk-101 (Comp. Ex.) | BL-1, BS-1 | — |
| Bk-102 (Comp. Ex.) | A, C | — |
| Bk-103 (Comp. Ex.) | B, C | — |
| Bk-104 (Comp. Ex.) | B, BS-1 | — |
| Bk-105 (Comp. Ex.) | BL-1, BS-1 | Ethylene glycol 5 g/l |
| Bk-106 (Comp. Ex.) | BL-1, BS-1 | Sodium acetate 5 g/l |
| Bk-107 (Invention) | BL-1, BS-1 | Sodium EDTA-4 5 g/l |
| Bk-108 (Invention) | BL-1, BS-1 | Sodium picolinate 5 g/l |
| Bk-109 (Invention) | BL-2, BS-1 | Sodium picolinate 5 g/l |
| Bk-110 (Invention) | BL-1, BS-2 | Sodium EDTA-4 5 g/l |

For comparison, the black cartridge for "PM-950C" (product of Seiko Epson Corp.) was used.

An image with a gray image pattern and a character pattern was printed using, as a black ink, each of the above-described black inks filled in the cartridge of Inkjet printer "PM-950C" manufactured by Seiko Epson, and as the other color inks, the inks of "PM-950C". The image also included a black square symbol of JIS code 2223 printed in 48 point. In addition, the color tone of the image was visually evaluated by using a test image chart of ISO/JIS 1264. The image was printed on "Kassai", inkjet photo glossy paper (product of Fuji Photo Film) used as an image receiving sheet, and the quality of the image thus printed and discharge property and fastness of the ink were evaluated.

1) After the cartridge was set on a printer and ejection of the ink from all the nozzles was confirmed, the printer was stopped. The printer was allowed to stand under the conditions of 15° C. and 30% RH and then conditions of 35° C. and 90% RH for 150 hours. An A4 image was then output on 100 sheets of paper, from which the discharge property was evaluated based on the below-described criteria.

A: No disorder existed in the print from the starting till the end of printing.

B: An image with disorders was printed.

C: Disorders continue to appear in the print from the starting till the end of printing.

2) Image storage stability of a black dye was evaluated based on the below-described standards by using a print sample. More specifically, a black square symbol of JIS code 2223 printed in 48 point (this will hereinafter be called "Pattern S") was evaluated by measuring using an X-rite 310 TR densitometer equipped with Status A Filter.

(1) The light fastness was evaluated in such a manner that after measurement of the density $(D_{vis})$ Ci of the pattern S immediately after printing, the image was exposed to xenon light (85,000 lux) for 14 days by means of a weatherometer manufactured by Atlas. The density Cf of the pattern S was measured again and a dye remaining ratio (100×Ci/Cf) was found, based on which evaluation was made.

The light fastness was ranked as A when the ratio was 80% or greater, B when the ratio was 70% or greater but less than 80%, and C when the ratio was less than 70%.

(2) Heat fastness was evaluated based on a dye remaining ratio determined by measuring the density of the pattern S by X-rite 310TR before and after an image sample was preserved for 21 days under the conditions of 80° C. and 70% RH.

The heat fastness was ranked as A when the dye remaining ratio is 90% or greater, B when the remaining ratio is 80% or greater but less than 90%, and C when the ratio is less than 80%.

(3) The ozone $(O_3)$ fastness was evaluated based on a dye remaining ratio determined by leaving an image sample in a box having a ozone concentration of 5 ppm for 72 hours, measuring the density of the pattern S by X-rite 310TR before and after the sample was left under the influence of the ozone gas.

The ozone gas concentration in the box was set using an ozone gas monitor (model: OZG-EM-01) manufactured by APPLICS.

The ozone fastness is ranked A when the dye remaining ratio is 80% or greater, B when it is 70% or greater but less than 80%, and C when it is less than 70%.

3) Blur of an image under high humidity conditions was evaluated as follows. A print pattern having four 3 cm×3 cm black squares arranged in two rows and a white space of 1 mm therebetween was formed and this image sample was stored under the conditions of 25° C. and 90% RH for 10 days. The blur of the black dye in the white space was observed and an increase in the density (Dvis) of the white background relative to that just after printing was measured.

Blur of an image is ranked A when an increase in the density is 0.01 or less, B when it is 0.01 to 0.05 and C when it is 0.05 or greater.

The results are shown in Table 8.

TABLE 8

| No. | Discharge property | Light fastness | Heat fastness | $O_3$ fastness | Blur of Image |
|---|---|---|---|---|---|
| PM-950C (Bk) (Comp. Ex.) | A | B | B | C | C |

TABLE 8-continued

| No. | Discharge property | Light fastness | Heat fastness | O₃ fastness | Blur of Image |
|---|---|---|---|---|---|
| Bk-101 (Comp. Ex.) | B | A | A | A | A |
| Bk-102 (Comp. Ex.) | C | C | B | C | B |
| Bk-103 (Comp. Ex.) | C | C | B | C | C |
| Bk-104 (Comp. Ex.) | C | A | A | A | C |
| Bk-105 (Comp. Ex) | B | A | A | A | A |
| Bk-106 (Comp. Ex.) | B | A | A | A | A |
| Bk-107 (Invention) | A | A | A | A | A |
| Bk-108 (Invention) | A | A | A | A | A |
| Bk-109 (Invention) | A | A | A | A | A |
| Bk-110 (Invention) | A | A | A | A | A |

The results of Table 8 have revealed that the ink systems of the invention were superior in all the performances to the ink systems of comparative examples.

In particular, in the ink systems of the invention, the black image continued to be solid, thus maintaining a good condition.

It has been found as a result of comparison in a black image that the ink systems (Bk-103 and Bk-104) using the long-wavelength-side black dye (B) were much inferior in color balance of the image after fading.

The reflection densities ($D_R$, $D_G$, $D_B$) of three colors, C (cyan), M (magenta) and Y (yellow) of the pattern S were measured simultaneously using X-rite 310 TR densitometer equipped with Status A Filter. When the forced fading rate constant ($k_R$, $k_G$, $k_B$) of the pattern S was found from the test, the ink systems using the black ink of the invention all exhibited 1.05 or greater as a ratio (R) of the maximum value to the minimum value. The ratios (R) of the ink systems using Bk-102 to Bk-106 were all 1.25 or greater, showing that the fading balance of the black image was lost greatly.

The above-described results evidently show the advantage of the invention.

The ink of the invention prepared in a similar manner to the above-described Example except for the use of another dye represented by the formula (1) as a black dye also showed similar advantages in the performances and color hues.

Similar results and advantages were observed even when "PM photographic paper" (product of Seiko Epson) or "PR101" (product of Canon) was used in the invention as image receiving paper instead.

The invention makes it possible to provide, in a water based ink advantageous from the viewpoints of handling property, odor and safety, a black ink for inkjet recording excellent in durability of an image including image quality and discharge property even after the ink is filled in an ink cassette and stored for a long period of time while being set in a printer.

The entire disclosure of each and every foreign patent application: Japanese Patent Applications No. 2002-286486, from which the benefit of foreign priority has been claimed in the present application is incorporated herein by reference, as if fully set forth.

What is claimed is:

1. A black ink for inkjet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0 and is a dye represented by the following general formula (1):

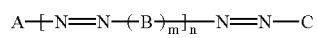

wherein A, B and C each independently represent an aromatic or heterocyclic group, which are substituted or unsubstituted; m is 1 or 2; n is an integer of 0 or more, wherein the black ink comprises at least one metal chelating agent and has a forced fading rate constant $k_{vis}$ of $5.0 \times 10^{-2}$ [hour$^{-1}$] or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density.

2. A black ink for inkjet recording, comprising a first dye and a second dye dissolved and/or dispersed in an aqueous medium, in which the first dye has a λmax of 500 to 700 nm and a half value width of 100 nm or more in an absorption spectrum of a dilute solution normalized to an absorbance of 1.0 and is a dye represented by the following general formula (1):

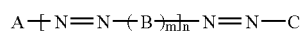

wherein A, B and C each independently represent an aromatic or heterocyclic group, which are substituted or unsubstituted; m is 1 or 2; n is an integer of 0 or more and the second dye has a λmax of 350 to 500 nm in an absorption spectrum of an aqueous solution and is a dye represented by the following general formula (1):

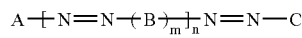

wherein A, B and C each independently represent an aromatic or heterocyclic group, which are substituted or unsubstituted; m is 1 or 2; n is an integer of 0 or more, wherein the black ink comprises at least one metal chelating agent.

3. A black ink for inkjet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0 and is a dye represented by the following general formula (1):

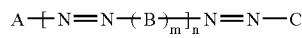

wherein A, B and C each independently represent an aromatic or heterocyclic group, which are substituted or unsubstituted; m is 1 or 2; n is an integer of 0 or more,
wherein the black ink comprises at least one metal chelating agent and has a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

4. A black ink for inkjet recording, comprising a dye dissolved and/or dispersed in an aqueous medium, wherein the dye has a λmax of 500 to 700 nm and a half value width of 100 nm or more in an absorption spectrum of a dilute solution normalized to an absorbance of 1.0 and is a dye represented by the following general formula (1):

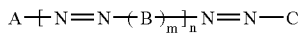

wherein A, B and C each independently represent an aromatic or heterocyclic group, which are substituted or unsubstituted; m is 1 or 2; n is an integer of 0 or more,
wherein the black ink comprises: at least one metal chelating agent; and a dye having an oxidation potential of more than 1.0 V (vs SCE).

5. The black ink for inkjet recording according to claim 4, wherein the dye having a λmax of 500 to 700 nm includes a dye having an oxidation potential of more than 1.0 V (vs SCE).

6. The black ink for inkjet recording according to claim 1, which has a ratio R of 1.2 or less, in which the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

7. The black ink for inkjet recording according to claim 6, which comprises a dye having an oxidation potential of more than 1.0 V (vs SCE).

8. The black ink for inkjet recording according to claim 2, which has: a forced fading rate constant $k_{vis}$ of $5.0 \times 10^{-2}$ [hour$^{-1}$] or less; and a ratio R of 1.2 or less,
in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density, and the ratio R is defined as a ratio of a maximum value to a minimum value of a forced fading rate constants $k_R$, $k_G$ and $k_B$ that are decided by printing a black square symbol of JIS code 2223 in 48-point by using the black ink, measuring reflection densities $D_R$, $D_G$ and $D_B$ of the printed symbol with respect to 3 colors of C (cyan), M (magenta) and Y (yellow) through a status A filter to obtain initial densities, respectively, forcedly fading the printed symbol by an ozone fading tester capable of continuously generating 5 ppm of ozone, and determining the times taken until the reflection densities $D_R$, $D_G$ and $D_B$ reach 80% of the initial densities, respectively.

9. The black ink for inkjet recording according to claim 8, which comprises a dye having an oxidation potential of more than 1.0 V (vs SCE).

10. The black ink for inkjet recording according to claim 3, which has a forced fading rate constant $k_{vis}$ of $5.0 \times 10^{-2}$ [hour$^{-1}$] or less, in which the forced fading rate constant $k_{vis}$ is decided by printing a black square symbol of JIS code 2223 in 48-point by using the black ink, measuring a reflection density $D_{vis}$ of the printed symbol through a status A filter to obtain an initial density, forcedly fading the printed symbol by an ozone fading tester capable of continuously generating 5 ppm of ozone, and determining the time taken until the reflection density $D_{vis}$ reaches 80% of the initial density.

11. The black ink for inkjet recording according to claim 10, which comprises a dye having an oxidation potential of more than 1.0 V (vs SCE).

12. The black ink for inkjet recording according to claim 1, which comprises a dye having a λmax of 350 to 500 nm in an absorption spectrum of an aqueous solution represented by the following general formula (1):

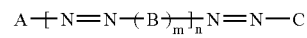

wherein A, B and C each independently represent an aromatic or heterocyclic group, which are substituted or unsubstituted; m is 1 or 2; n is an integer of 0 or more.

13. The black ink for inkjet recording according to claim 3, which comprises a dye having a λmax of 350 to 500 nm in an absorption spectrum of an aqueous solution represented by the following general formula (1):

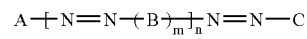

wherein A, B and C each independently represent an aromatic or heterocyclic group, which are substituted or unsubstituted; m is 1 or 2; n is an integer of 0 or more.

14. The black ink for inkjet recording according to claim 4, which comprises a dye having a λmax of 350 to 500 nm in an absorption spectrum of an aqueous solution represented by the following general formula (1):

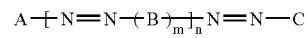

wherein A, B and C each independently represent an aromatic or heterocyclic group, which are substituted or unsubstituted; m is 1 or 2; n is an integer of 0 or more.

* * * * *